United States Patent
Matsuzawa et al.

(10) Patent No.: US 10,235,282 B2
(45) Date of Patent: Mar. 19, 2019

(54) COMPUTER SYSTEM, COMPUTER, AND METHOD TO MANAGE ALLOCATION OF VIRTUAL AND PHYSICAL MEMORY AREAS

(71) Applicant: Hitachi, Ltd., Tokyo (JP)

(72) Inventors: Keiichi Matsuzawa, Tokyo (JP); Hitoshi Kamei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/544,529

(22) PCT Filed: Jun. 1, 2015

(86) PCT No.: PCT/JP2015/065751
§ 371 (c)(1),
(2) Date: Jul. 19, 2017

(87) PCT Pub. No.: WO2016/194102
PCT Pub. Date: Dec. 8, 2016

(65) Prior Publication Data
US 2017/0351601 A1    Dec. 7, 2017

(51) Int. Cl.
*G06F 12/00* (2006.01)
*G06F 12/02* (2006.01)
(Continued)

(52) U.S. Cl.
CPC ........ *G06F 12/0238* (2013.01); *G06F 12/023* (2013.01); *G06F 12/0638* (2013.01);
(Continued)

(58) Field of Classification Search
CPC .. G06F 12/0238; G06F 12/10; G06F 12/0638; G06F 12/0871; G06F 12/109;
(Continued)

(56) References Cited

U.S. PATENT DOCUMENTS

| | | | |
|---|---|---|---|
| 2003/0174839 A1* | 9/2003 | Yamagata | G06F 12/1433 380/270 |
| 2009/0313452 A1* | 12/2009 | Barsness | G06F 12/1027 711/203 |
| 2011/0145476 A1 | 6/2011 | Hulbert et al. | |

OTHER PUBLICATIONS

International Search Report of PCT/JP2015/065751 dated Aug. 11, 2015.

* cited by examiner

*Primary Examiner* — Mark A Giardino, Jr.
(74) *Attorney, Agent, or Firm* — Mattingly & Malur, PC

(57) ABSTRACT

An allocation request for requesting allocation of a target virtual area with respect to target data issued to a system program includes a target ID corresponding to the target data. In response to the allocation request, whether or not the target ID is included in data map information is determined. When it is included in the data map information, the system program determines whether or not a target physical area is included in a storage apparatus. When the target physical area is included in the storage apparatus, the system program reserves a free area in a non-volatile memory as a target memory area, copies target data stored in the storage apparatus to the target memory area, changes the target physical area in the data map information to the target memory area, and writes an association between the target virtual area and the target memory area into the volatile memory.

15 Claims, 17 Drawing Sheets

(51) Int. Cl.
*G06F 12/10* (2016.01)
*G06F 12/06* (2006.01)
*G06F 12/0871* (2016.01)
*G06F 12/109* (2016.01)
*G06F 13/00* (2006.01)
*G06F 13/28* (2006.01)

(52) U.S. Cl.
CPC .......... *G06F 12/0871* (2013.01); *G06F 12/10* (2013.01); *G06F 12/109* (2013.01); *G06F 2212/1044* (2013.01); *G06F 2212/152* (2013.01); *G06F 2212/202* (2013.01); *G06F 2212/205* (2013.01); *G06F 2212/222* (2013.01); *G06F 2212/461* (2013.01); *G06F 2212/466* (2013.01); *G06F 2212/65* (2013.01); *G06F 2212/7201* (2013.01)

(58) Field of Classification Search
CPC ....... G06F 2212/1044; G06F 2212/202; G06F 2212/205; G06F 2212/65; G06F 2212/152; G06F 2212/222; G06F 2212/461; G06F 2212/466; G06F 2212/7201
See application file for complete search history.

132

| | Data ID | Size | PID | Virtual address | Physical address | Move destination |
|---|---|---|---|---|---|---|
| 370a | ABC12 | 0x10000 | 123 | 0x500000 | 0x20000 | - |
| 370b | DEF34 | 0x5000 | 456 | 0x600000 | 0x40000 | - |
| | | | 789 | 0x700000 | | |
| 370c | GHI56 | 0x20000 | | - | 0x50000 | - |
| 370d | JKL78 | 0x10000 | | - | - | Disk 1 LBA 0x5000 |

Columns: 310 Data ID, 320 Size, 330 PID, 340 Virtual address, 350 Physical address, 360 Move destination

| | Data ID | Size | PID | Virtual address | Guest physical address |
|---|---|---|---|---|---|
| 910a | ABC12 | 0x10000 | 123 | 0x500000 | 0x100000 |
| 910b | DEF34 | 0x5000 | 456 | 0x600000 | 0x200000 |
| | | | 789 | 0x700000 | |
| 910c | GHI56 | 0x20000 | | - | 0x300000 |

Columns: 310, 320, 330, 340, 950

Fig. 9

| | Data ID | Size | Guest ID | Guest physical address | Physical address | move destination |
|---|---|---|---|---|---|---|
| 971 | ABC12 | 0x10000 | xyz | 0x100000 | 0x20000 | - |
| 972 | DEF34 | 0x5000 | stu | 0x200000 | 0x40000 | - |
| 973 | | | abc | 0x300000 | | |
| | GHI56 | 0x20000 | | - | 0x50000 | - |
| 974 | JKL78 | 0x10000 | | - | - | Disk 1 LBA 0x5000 |

| | Data ID | Size | PID | Virtual address | Storage destination computer | Physical address | move destination |
|---|---|---|---|---|---|---|---|
| 370a | ABC12 | 0x10000 | 123 | 0x500000 | 1 | 0x20000 | - |
| 370b | DEF34 | 0x5000 | 456 | 0x600000 | 2 | 0x40000 | - |
| | | | 789 | 0x700000 | | | |
| 370c | GHI56 | 0x20000 | - | - | 2 | 0x50000 | - |
| 370d | JKL78 | 0x10000 | - | - | - | - | Disk 1 LBA 0x5000 |

Column labels: 310, 320, 330, 340, 1550, 350, 360

Fig. 16

COMPUTER SYSTEM, COMPUTER, AND METHOD TO MANAGE ALLOCATION OF VIRTUAL AND PHYSICAL MEMORY AREAS

TECHNICAL FIELD

The present invention relates to a computer system including a non-volatile memory.

BACKGROUND ART

Conventionally, a volatile storage element such as a Dynamic Random Access Memory (DRAM) is mainly used as a memory for a computer. Since a DRAM must be regularly energized in order to retain data, the DRAM loses its internal data when energization of a computer is interrupted. Therefore, various software that run on the computer are also premised on such characteristics of the DRAM and store data intended for long-term storage, in a storage medium that need not be energized to retain data such as an external magnetic storage medium, instead of in a memory.

As a result of recent advancements made in research and development of storage elements, storage elements that do not require regular energization have become available and memories using such storage elements are increasingly being put to practical use. Examples of such memories include a Phase Change Memory and a Resistive Random Access Memory. Such memories continuously retain data even through power interruptions and are therefore collectively referred to as Non-Volatile Memories or Persistent Memories.

In addition, from the perspective that such non-volatile memories can substitute for conventional storage media which do not require energization, the non-volatile memories are also referred to as Storage Class Memories (SCMs). In the present specification, hereinafter, a memory capable of retaining data through a power interruption will be referred to as an SCM.

In a general computer, a process of each application program is given a virtual address space (a virtual area) unique to the process which is separate from a physical address space (a physical area) of a memory actually mounted to the computer. The process runs on the virtual address space. Therefore, for the process to read/write data from/to an SCM, a system program such as an OS (Operating System) or a hypervisor which manages hardware must map an area of the SCM onto the virtual address space of the process.

A conventional computer using a DRAM as a memory is not premised on the fact that, when a same application program is executed a plurality of times, data of a previous execution remains on the memory. Therefore, no problems arise even when areas of the memory which are mapped to a virtual address space of a process by previous and current executions differ from each other.

On the other hand, when an SCM is used as a memory, in order to reuse data of a previous execution, an area of the SCM during the previous execution must be once again mapped to the virtual address space of the process. However, normally, there is no way for an application program to recognize what area is being mapped to the virtual address space of its own process. Therefore, the application program is unable to once again map, to a virtual space of the process, an area of the SCM which had been a storage destination of data during a previous execution.

As means for realizing such mapping, PTL 1 discloses a method in which an application program issues a mapping request of an SCM using a unique key.

CITATION LIST

Patent Literature

[PTL 1]
U.S. Patent Application Publication No. 20110145476A1

SUMMARY OF INVENTION

Technical Problem

However, with the technique described in PTL 1, a physical area can only be allocated to a virtual area of an application program up to a capacity of a non-volatile memory. Therefore, the application program is only able to use an area of a non-volatile memory in a computer on which the application program is executed. In addition, in a computer system equipped with various functions, a virtual area of an application program may be associated with not only an area of a non-volatile memory in the computer executing the application program but also with various other areas.

Solution to Problem

A computer system includes one or more computers. The computer includes a processor, a non-volatile memory coupled to the processor, and a volatile memory coupled to the processor. The processor is configured to execute a system program and an application program that uses the system program. The non-volatile memory is configured to store data map information which associates an ID related to data used by the application program, a virtual area used by the application program, and a physical area that stores the data with each other. The physical area is an area included in any of the non-volatile memory and a storage apparatus coupled to the processor. The application program is configured to issue, to the system program, an allocation request for requesting an allocation of a target virtual area with respect to target data. The allocation request includes a target ID corresponding to the target data. The system program is configured to, in response to the allocation request, determine whether or not the target ID is included in the data map information. The system program is configured to, when it is determined that the target ID is included in the data map information, determine whether or not a target physical area is included in the storage apparatus based on the data map information. The system program is configured to, when it is determined that the target physical area is included in the storage apparatus, reserve a free area in the non-volatile memory as a target memory area, copy the target data stored in the storage apparatus to the target memory area, change the target physical area in the data map information to the target memory area, and write an association between the target virtual area and the target memory area into the volatile memory.

Advantageous Effects of Invention

Even when an application program is restarted due to a power interruption of a computer or the like, the application program can continuously use data prior to the restart even after the restart.

BRIEF DESCRIPTION OF DRAWINGS

FIG. 3 shows an example of an ID map table 132 according to the first embodiment.

FIG. 9 shows an example of an ID map table 732 according to the second embodiment.

FIG. 10 shows an example of a guest ID map table 733 according to the second embodiment.

FIG. 16 shows an example of an ID map table 1332 according to the third embodiment.

DESCRIPTION OF EMBODIMENTS

Although various types of information will be described below using expressions such as an "aaa table", the various types of information may be expressed by data structures other than a table. An "aaa table" can be referred to as "aaa information" in order to demonstrate that the various types of information are not dependent on data structure.

In addition, in the following description, a processor executes a program and performs a process using a storage resource (such as a memory) and/or a communication interface device (such as a communication port). While various programs are sometimes considered processing entities in the following description, alternatively, a processor executing the programs may be considered a processing entity. Furthermore, a process with a processor as its processing entity can be interpreted to be performed by executing one or more programs. While a processor is typically a microprocessor such as a CPU (Central Processing Unit), the processor may include a hardware circuit which executes a part of the process (for example, encoding/decoding and compression/expansion).

Furthermore, in the following description, when describing elements of a same type without distinguishing the elements from one another, reference signs will be used. However, when describing elements of a same type by distinguishing the elements from one another, identifiers (for example, at least one of numerals and characters) assigned to the elements may be used in place of the reference signs of the elements. Hereinafter, several embodiments will be described.

First Embodiment

Figure 1:
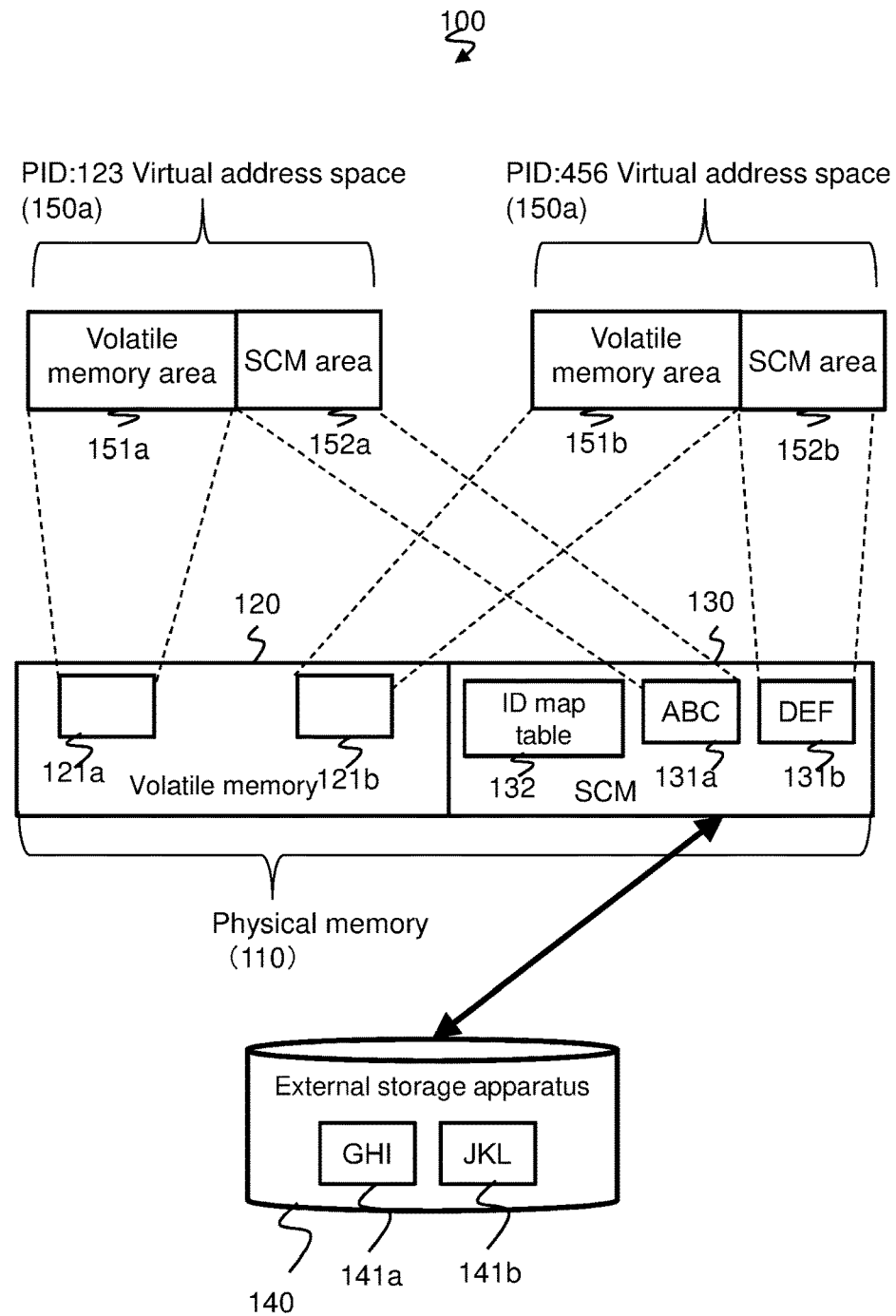
FIG. 1 is a diagram for illustrating an outline of a first embodiment.

FIG. 1 is a diagram for illustrating an outline of a first embodiment. A mapping example 100 of a memory area of a computer 200 in a computer system is shown.

The computer 200 includes a volatile memory 120 and an SCM 130. Hereinafter, the volatile memory 120 and the SCM 130 will be collectively referred to as a physical memory 110. When a processor executes an application, a plurality of processes run using the physical memory 110. An ID uniquely indicating a process will be referred to as a PID.

FIG. 1 shows an example of a state where two process with PIDs of "123" and "456" are running. Virtual address spaces 150a and 150b are virtual spaces required by the respective processes to run. The virtual address spaces 150a and 150b include volatile memory areas 151a and 151b and SCM areas 152a and 152b. The volatile memory areas 151a and 151b are mapped to process mapped areas 121a and 121b which are partial physical areas in the volatile memory 120. The SCM areas 152a and 152b are mapped to process mapped SCM areas 131a and 131b which are partial physical areas in the SCM 130. The mapping is performed by an OS 224 which is an example of a system program.

Each piece of data stored in the process mapped SCM areas 131a and 131b is assigned a unique data ID. A data ID is an ID which uniquely identifies a piece of data. By assigning data IDs to the data in the process mapped SCM areas 131a and 131b, the computer 200 is capable of uniquely identifying data of a process being executed. For example, a data ID "ABC" is assigned to data in the process mapped SCM area 131a and a data ID "DEF" is assigned to data in the process mapped SCM area 131b.

An ID map table 132 is a table which associates, using a data ID of a process being executed, a virtual address space storing the data and a physical area with each other.

Since the SCM 130 is a non-volatile memory, data in the SCM 130 is retained even after a restart of an OS or an application program due to power interruption of the computer 200 and the like.

When a power interruption of the computer 200 occurs during the execution of a process by an application program, in order to use data previously used by the process after a restart, a process mapped SCM area in which the data is actually stored must be remapped to a virtual address space of the process. In doing so, by using a data ID to send an allocation request of an SCM to the OS, the process of the application program can cause the process mapped SCM area having stored the data during the previous running of the process to be mapped to the virtual address space.

The mapping example 100 represents a state where a process with a PID of "123" has mapped the process mapped SCM area 131a storing data with the data ID "ABC" to the SCM area 152a of the process' own virtual address space 150a and a state where a process with a PID of "456" has mapped the process mapped SCM area 131b storing data with the data ID "DEF" to the SCM area 152b of the process' own virtual address space 150b.

In addition, when the process using the data represented by the data ID is not running, the data can be deleted from the corresponding process mapped SCM area 131 and moved to an external storage apparatus 140. For example, areas 141a and 141b in the external storage apparatus 140 respectively contain data represented by data IDs "GHI" and "JKL". Since processes using these pieces of data are not running, the pieces of data are temporarily moved in the external storage apparatus 140.

In the mapping example 100, the process mapped SCM areas 131a and 131b and the SCM areas 152a and 152b of the respective processes are mapped one-on-one to each other. Alternatively, a plurality of SCM areas may be mapped to one process mapped SCM area. For example, a plurality of process mapped CM areas 131 mapped to the SCM areas 152a and 152b of the respective processes may be consecutively arranged in the SCM 130. In addition, for example, the SCM areas 152a and 152b of the respective processes may be mapped to a single process mapped SCM area 131a. In this case, the process mapped SCM area 131a is shared between the SCM areas 151a and 152b of the plurality of processes.

By mapping the process mapped SCM area 131 which is a partial area of the SCM 130 to the SCM areas 152a and 152b of the virtual address spaces 150a and 150b in the processes, even when an application program is restarted due to a failure such as a power interruption of the computer 200 or the like, the application program can continuously use data prior to the restart even after the restart. The application program can access an SCM containing data at high speed.

In order to access data on a persistent storage medium such as a magnetic disk, a conventional computer must issue a system call for reading and writing data to the OS or use a method such as memory-mapped file. Since both of these methods require involvement of OS operations in accessing data on the persistent storage medium, data access takes time. However, the SCM 130 according to the present embodiment operates as a memory on the computer 200. Therefore, once an area in the SCM 130 is mapped to a virtual address space, the OS need no longer be involved in data access by an application program. The application program can complete the data access by reading from or writing to the memory and high-speed access is enabled.

In addition, generally, an SCM provides faster processing but is more expensive than storage apparatuses such as an HDD (Hard Disk Drive) and an SSD (Solid State Drive). Therefore, it is difficult to reserve a capacity of a physical area that can be mapped to virtual spaces of all processes entirely with an SCM. With the computer system according to the present embodiment, since the ID map table 132 is capable of using a data ID to associate a virtual area of the data with a physical area of an actual storage destination and read data in the external storage apparatus 140 onto the SCM 130, a large-capacity storage area can be reserved at low cost in a computer system which enables high-speed access as described above.

Figure 2:
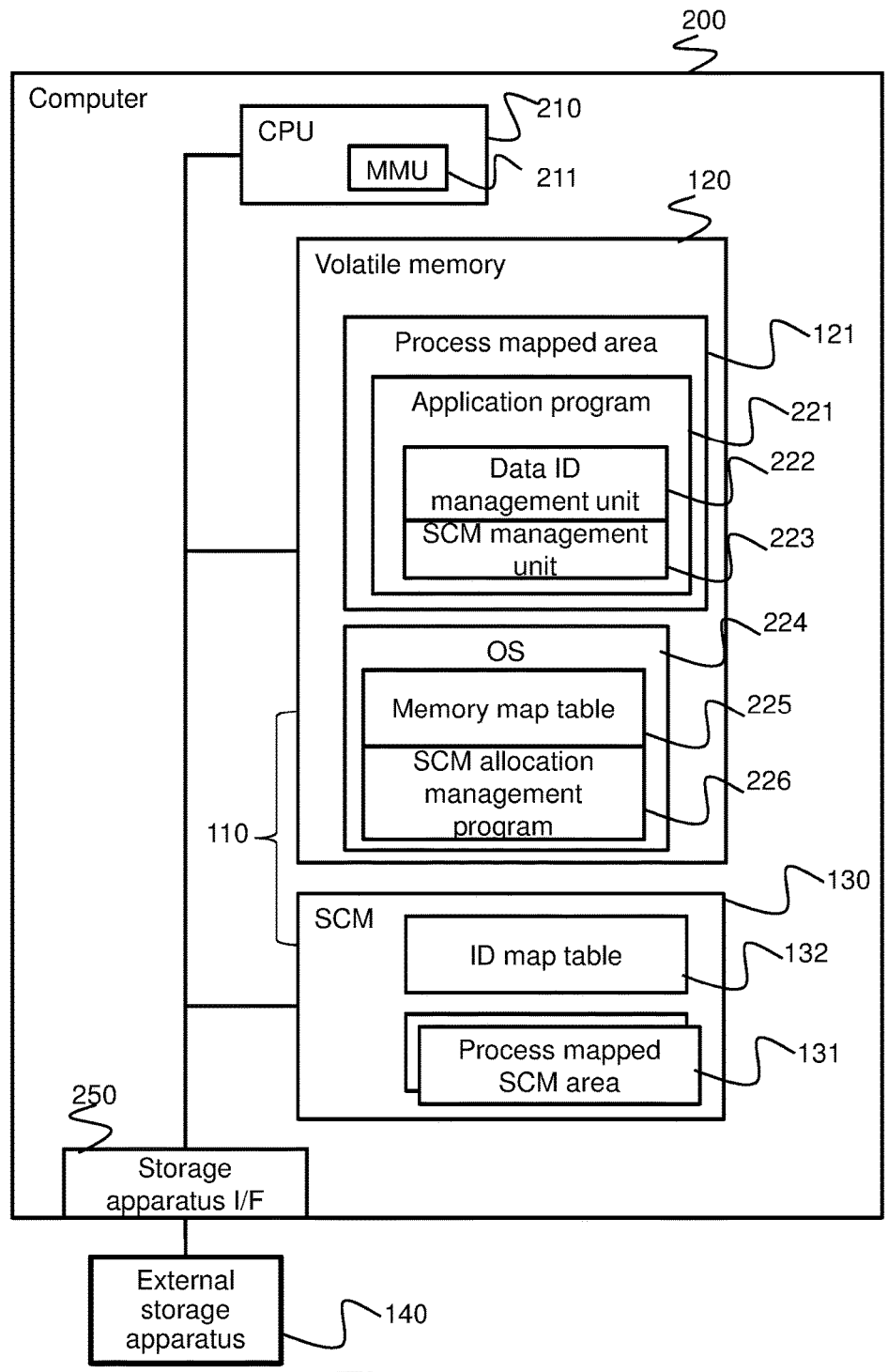
FIG. 2 is a configuration diagram of a computer system according to the first embodiment.

FIG. 2 is a configuration diagram of a computer system according to the first embodiment.

The computer system includes the computer 200 and the external storage apparatus 140. While the computer system includes one computer 200 and one external storage apparatus 140 in the illustrated example, both the computer 200 and the external storage apparatus 140 may be provided in plurality.

The external storage apparatus 140 stores various programs and tables to be deployed on a volatile memory. In addition, the external storage apparatus 140 has an area for temporarily moving data in a process mapped SCM area of which mapping to a virtual address space has been released among the pieces of data in the virtual address space to which data IDs have been assigned.

Examples of a storage apparatus used for the external storage apparatus 140 includes a magnetic storage medium such as an HDD and a tape apparatus, a semiconductor storage medium such as an SSD, an optical disk such as a DVD (Digital Versatile Disc), and a disk array apparatus. Alternatively, another computer may be used as the external storage apparatus 140 and data may be transferred to the other computer.

The external storage apparatus 140 is coupled to the computer 200 via a storage apparatus interface 250 in the computer 200. The storage apparatus interface 250 is an interface for transferring data between the computer 200 and the external storage apparatus 140. Examples of the storage apparatus interface 250 include an SCSI (Small Computer System Interface), a SATA (Serial ATA), and the Ethernet (registered trademark). Moreover, while the present embodiment represents an example in which the external storage apparatus 140 is externally attached to the computer 200, a storage apparatus identical or similar to the external storage apparatus 140 may be built into the computer 200.

The computer 200 includes a CPU 210, the volatile memory 120, the SCM 130, and the storage apparatus interface 250. The CPU 210 deploys various programs and tables in the external storage apparatus 140 on the volatile memory 120, and reads the various programs and tables to control the respective components of the computer 200.

The CPU 210 includes an MMU (Memory Management Unit) 211. When an application program 221 refers to the physical memory 110, the MMU 211 translates an address of a reference destination based on a correspondence relationship between a physical address and a virtual address stored in a memory map table 225.

The volatile memory 120 includes the OS 224 and one or a plurality of process mapped areas 121. The OS 224 is a program which controls the components of the computer 200. In the present embodiment, the OS is an OS. The OS 224 includes the memory map table 225 and an SCM allocation management program 226.

The memory map table 225 is a table which contains a correspondence relationship between a physical address and a virtual address and which is used for address translation by the MMU 221. The memory map table 225 corresponds to a table referred to as a page table or a segment table in conventionally known computers.

The SCM allocation management program 226 manages the ID map table 132. The SCM allocation management program 226 executes an SCM allocation process 400, an SCM allocation release process 500, and a data deletion process 600 to be described later.

The process mapped area 121 is an area associated with the volatile memory area 151 in the virtual address space 150 of each process. One or a plurality of process mapped areas 121 respectively include the application program 221.

The application program 221 includes a data ID management unit 222 and an SCM management unit 223. The data ID management unit 222 generates and manages IDs (for example, data IDs and PIDs) necessary when issuing an area allocation request of the SCM 130 to the OS 224. The SCM management unit 223 operates so as to store, in the SCM area 152, data that must be persistently stored among the pieces of data referred to by the application program 221. In addition, the SCM management unit 223 performs SCM allocation, allocation requests, and the like with respect to the SCM allocation management program 226.

While the application program 221 includes the data ID management unit 222 in FIG. 2, alternatively, the OS 224 may include the data ID management unit 222. In this case, data IDs are to be managed by the OS 224.

The SCM 130 includes the ID map table 132 and one or a plurality of process mapped SCM areas 131. The ID map table 132 is a table representing an association between data and a storage area of the data. The process mapped SCM area 131 is an area associated with the SCM area 152 in the virtual address space 150 of each process.

While the SCM 130 includes the ID map table 132 in FIG. 2, a medium other than the SCM 130 such as the external storage apparatus 140 may include the ID map table 132 as long as the medium is a non-volatile storage medium capable of persistently retaining data.

FIG. 3 shows an example of the ID map table 132 according to the first embodiment.

The ID map table 132 has an entry for each piece of data. Each of the entries 370a to 370d includes a data ID 310 that is an identifier of the data, a size 320 of the data, a PID 330 that is an identifier of a process using the data, a virtual address 340 that represents a storage position of the data in a virtual address space of the process, a physical address 350 that represents a storage position of the data in the storage destination SCM 130, and an move destination 360 that represents a storage position of the data in an external storage apparatus which is an move destination.

When data represented by the data ID 310 is stored in the SCM 130, a start address of the process mapped SCM area 131 is stored in the physical address 350. On the other hand, when data represented by the data ID 310 is stored in the external storage apparatus 140, the storage position of the data is stored in the move destination 360. FIG. 3 shows an LBA (Logical Block Address) in the move destination 360, as the storage position of the data in an external storage apparatus.

As described above, each of the entries 370a to 370d exists for each piece of data. However, the PID 330 and the virtual address 340 may exist in plurality with respect to one entry (piece of data). The existence of the PID 330 and the virtual address 340 in plurality in one entry indicates that an area of the physical memory 110 storing the data represented by each data ID 310 is mapped to the virtual address spaces of a plurality of processes represented by the PID 330.

Figure 4:
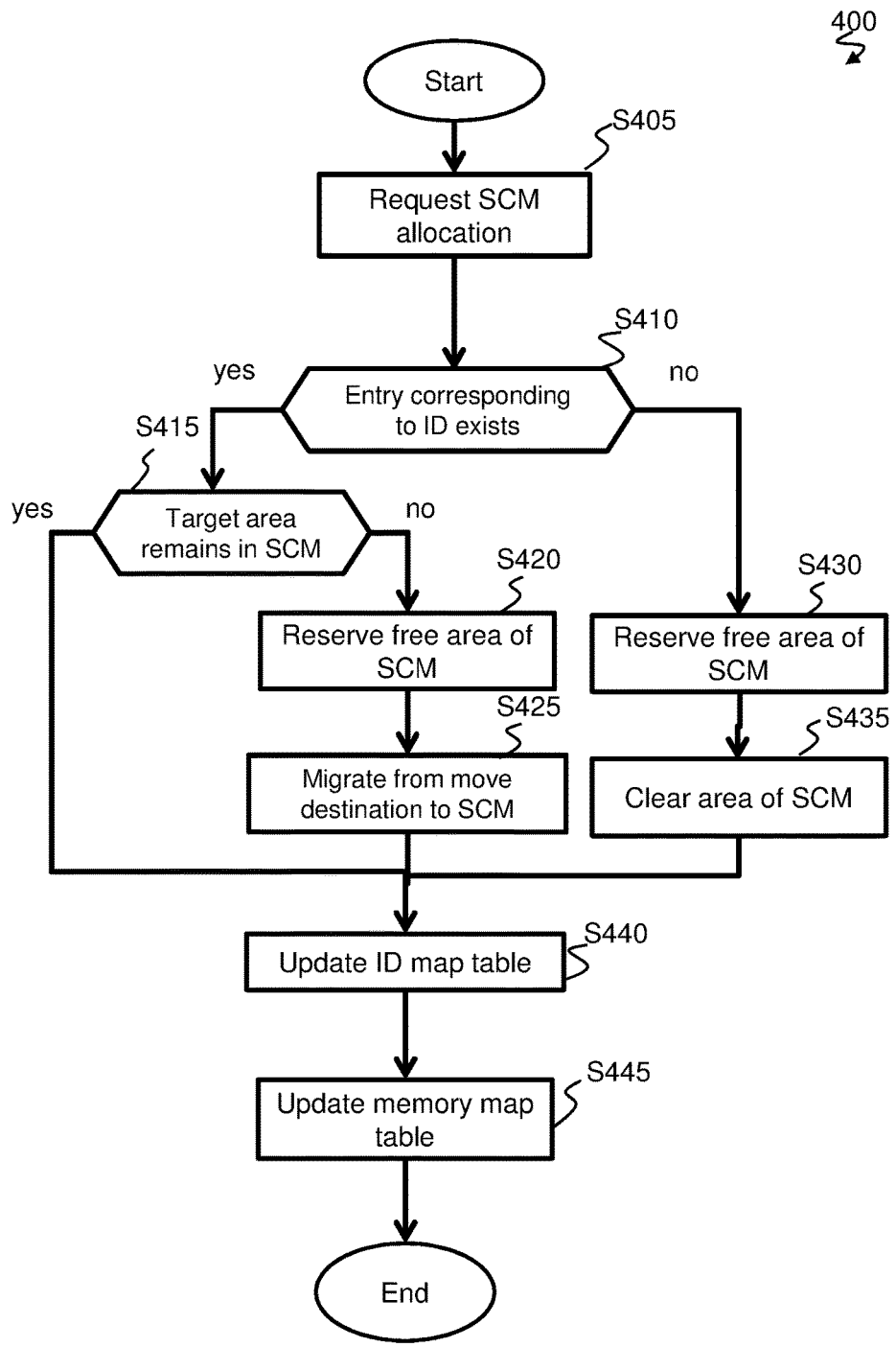
FIG. 4 shows an example of a flow chart of an SCM allocation process 400.

FIG. 4 shows an example of a flow chart of the SCM allocation process 400. The SCM allocation process 400 is a process of mapping the process mapped SCM area 131 storing data to the SCM area 152 using a data ID of the data.

This process is started upon the SCM allocation management program 226 of the OS 224 receiving an allocation request of an SCM area for target data to be used in a target process (S405).

The allocation request is transmitted from the SCM management unit 223 in the application program 221. The allocation request may be explicitly performed by the SCM management unit 223 or may be performed by the OS 224 when starting the application program 221. The allocation request at least includes, as additional information, a PID of a target process and a data ID of target data. The additional information may also include a size, a mapping destination virtual address, and authentication information. The size refers to a size of the SCM area 152. When a size is not particularly designated, a size of data (a value of the size 320 in the ID map table 132) is used.

The mapping destination virtual address is used when the application program 221 desires to fix a virtual address of a mapping destination. When a mapping destination virtual address is not particularly designated, the OS 224 selects a suitable address. The authentication information is information for confirming that a request source user program is authentic in order to prevent data from being referred to by an unauthorized user program. An example of the authentication information is a certificate using public key encryption.

In step S410, the SCM allocation management program 226 refers to the ID map table 132, searches for an entry 370 corresponding to the data ID of the target data, and determines whether or not the entry exists. The existence of an entry of the target data (S410; Yes) indicates that the target data is stored in the computer system. In this case, the SCM allocation management program 226 advances the process to step 415. On the other hand, the absence of an entry of the target data (S410; No) indicates that the target data is not stored in the computer system. In this case, the SCM allocation management program 226 advances the process to step 430.

Moreover, in step S410, the SCM allocation management program 226 may verify the authentication information included in the allocation request and detect a request source application program having unauthorized authentication information. Accordingly, contents of the SCM 130 can be prevented from being referred to by an unpredictable and unauthorized application program.

In step S415, the SCM allocation management program 226 refers to the ID map table 132 and determines whether or not the target data exists in the SCM 130. When an address is stored in the physical address 350 corresponding to the entry of the target data, the SCM allocation management program 226 determines that the target data exists in the process mapped SCM area 131 in the SCM 130 (S415; Yes). In this case, since there is no need to change the storage position of the target data, the SCM allocation management program 226 advances the process to step S440.

On the other hand, when an address is not stored in the physical address 350 corresponding to the entry of the target data and the address is stored in the move destination 360, the SCM allocation management program 226 determines that the target data exists in the external storage apparatus 140 (S415; No), and advances the process to step S420.

In step 420, the SCM allocation management program 226 searches for a free area of the SCM 130 and, based on the ID map table 132, reserves a free area with a size equal to or larger than the size 320 of the target data as the process mapped SCM area 131. When a free area cannot be reserved, the SCM allocation management program 226 considers the SCM allocation process a failure, notifies the application program 221 to execute the target process of an error, and ends the process.

Moreover, when the free area of the SCM 130 is smaller than the size 320 of the target data, other data may be temporarily moved to the external storage apparatus 140. In this case, for example, based on the ID map table 132, the SCM allocation management program 226 extracts an entry 370 of which the PID 330 is empty and of which the physical address 350 stores an address. Subsequently, data of the entry 370 is moved to the external storage apparatus 140 to reserve a free area. A conventionally known virtual memory management method using an LRU (Least Recently Used) list or the like can be applied to select data to be moved to the external storage apparatus 140.

In step S425, the SCM allocation management program 226 migrates the target data in the external storage apparatus 140 to the free area (the process mapped SCM area 131) reserved in S420. Accordingly, the target data moved to the external storage apparatus 140 can be once again read to the process mapped SCM area 131 on the SCM 130.

Steps S430 and S435 are processes for storing new target data in the SCM 130. In step 430, the SCM allocation management program 226 searches for a free area of the SCM 130 and reserves a free area with a size equal to or larger than the size 320 included in the allocation request as the process mapped SCM area 131. This process is similar to S420 described above.

In step S435, the SCM allocation management program 226 clears the reserved free area to zero.

In step 440, the SCM allocation management program 226 updates the ID map table 132. For example, when the target data is called from the move destination to the process mapped SCM area 131 (S425), the SCM allocation management program 226 deletes the move destination 360 of the entry of the target data and adds the reserved physical address 350 in the process mapped SCM area 131.

In addition, for example, when the target data is newly stored in the process mapped SCM area 131 (S435), the SCM allocation management program 226 adds an entry of the target data to the ID map table 132. Furthermore, the SCM allocation management program 226 adds the PID 330 of the request source process of the allocation request and the virtual address 340 of the SCM area. Moreover, when the target data already exists in the process mapped SCM area 131 in the SCM 130 (S415; Yes), the ID map table 132 is not updated.

In step S445, the OS 224 updates the memory map table 225 based on an allocation of the virtual address 340 and the physical address 350 of the ID map table 132, and ends the process. Specifically, based on the ID map table 132, the OS 224 writes a set of a virtual address and a physical address into the memory map table 225.

According to the process described above, the application program 221 can map the SCM area 152 into its own virtual address space 150. In addition, when the application program is not normally terminated due to a power interruption or the like, performing an SCM allocation request by adding a same data ID as a previous running of the application program 221 causes the process mapped SCM area 131 storing the same data as the previous running to be allocated to the SCM area 152 and enables the data to be used in a previous state.

Specifically, since the ID map table 132 is stored in the SCM 130, contents thereof are retained even in the event of a power interruption, etc. or a restart of the computer 200. Therefore, even when an unexpected failure such as a power interruption occurs in the computer 200, by having the restarted application program 221 once again perform an SCM allocation request using the same data ID, data prior to the occurrence of the failure can be restored immediately.

The OS can immediately restore the memory map table 225 based on the ID map table 132. Accordingly, by having the MMU 211 translate a virtual address into a physical address using the memory map table 225, the application program 221 can access the process mapped SCM area that had been used prior to the restart.

In addition, data stored in the external storage apparatus 140 can be read to the process mapped SCM area 131. Accordingly, data can be appropriately managed even when a total amount of data exceeds the capacity of the SCM 130. In other words, by having the external storage apparatus 140 and the SCM 130 cooperate with each other, a semblance that data exceeding the capacity of the SCM 130 is stored in a persistent storage medium can be presented to the application program 221.

Figure 5:
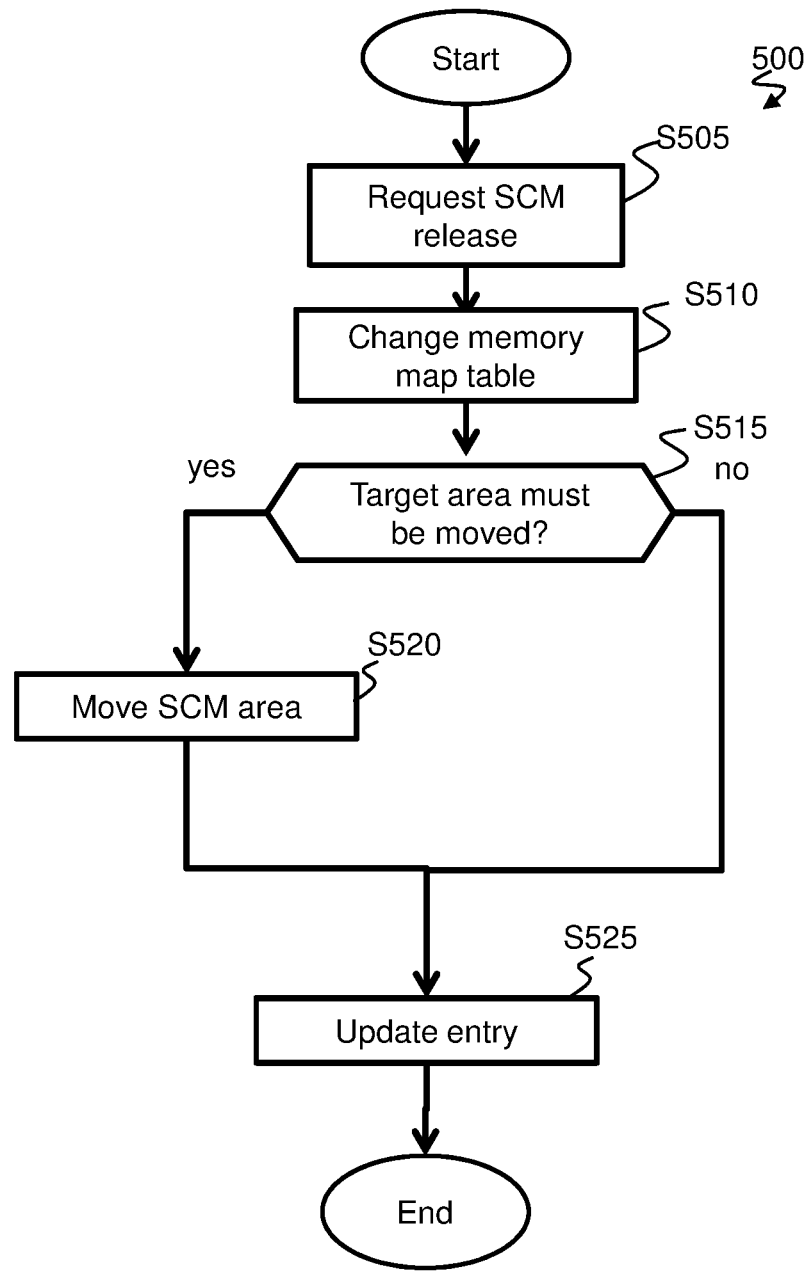
FIG. 5 shows an example of a flow chart of an SCM allocation release process 500.

FIG. 5 shows an example of a flow chart of the SCM allocation release process 500.

The SCM allocation release process 500 is a process of releasing mapping of the process mapped SCM area 131 storing target data corresponding to a data ID to the SCM area 152.

This process is started upon the SCM allocation management program 226 of the OS 224 receiving a release request of an SCM area (S505). The release request is transmitted from the SCM management unit 223 in the application program 221. However, due to other factors, the release request may be issued by the OS 224.

The OS 224 issues the release request in a case where, for example, the application program 221 is unable to transmit the release request due to not being normally terminated such as when the application program 221 is abnormally terminated as a result of a fault or when the application program 221 is forcibly terminated in accordance with maintenance of the computer 200 or the like. The release request includes a PID and a data ID as additional information. In addition, other information may be added as the additional information. For example, the additional information may include a flag designating which of the SCM 130 and the external storage apparatus 140 is to store the target data after release.

In step 510, the OS 224 extracts the entry 370 corresponding to the data ID of the target data and the PID of the target process included in the release request from the ID map table 132. In addition, the OS 224 refers to the virtual address 340 of the SCM area of the extracted entry and the physical address 350 of the process mapped SCM area, and releases the mapping of the virtual address and the physical address in the memory map table 225. Accordingly, the target data in the SCM can no longer be referred to by applications.

In step S515, the SCM allocation management program 226 determines whether to leave the target data in the process mapped SCM area 131 or to move the target data to the external storage apparatus 140. When it is determined that the target data is to be moved to the external storage apparatus 140 (S515; Yes), the SCM allocation management program 226 moves the target data to a free area of the external storage apparatus 140 (S520), and advances the process to S525. On the other hand, when it is determined that the target data is to be left in the process mapped SCM area 131 (S515; No), the SCM allocation management program 226 advances the process to S525 without migrating the target data.

There are several conceivable cases where the target data is left in the process mapped SCM area 131. These are cases where, for example, the additional information in the release request specifies that the target data be left in the SCM 130. Other cases include, for example, when the target data in the process mapped SCM area 131 is being referred to by a process other than the target process and when the SCM 130 has sufficient capacity and the target data need not be immediately moved.

On the other hand, cases where the target data in the process mapped SCM area 131 is moved to the external storage apparatus 140 include, for example, when the additional information in the release request specifies that the target data be moved to the external storage apparatus 140. Other cases include, for example, when there is a shortage of free area in the SCM 130 and when it is estimated that there is some time until a next allocation request of the target data is issued based on an operation log of the target process or the like.

In step 525, the SCM allocation management program 226 updates contents of the entry of the target data in the ID map table 132. Specifically, for example, the SCM allocation management program 226 deletes the PID 330 and the virtual address 340 from the target entry. In addition, when the target data is moved to the external storage apparatus 140 in step S520, a field of the physical address 350 of the entry of the target data is deleted and an address of an area storing the target data is added to the move destination 360.

According to the process described above, the SCM area 152 can be released in an appropriate manner both when the application program 221 runs normally and when the application program 221 is abnormally terminated due to whatever reason.

In addition, data corresponding to the SCM area 152 can be continuously stored in the SCM 130 or moved to the external storage apparatus 140. Due to the series of operations, particularly, even when the application program 221 is abnormally terminated, data stored in the SCM 130 prior to the termination is stored even after a restart of the application program. Furthermore, when another program requiring the capacity of the SCM area 152 is running, by migrating data in the SCM area 152 of the application program to be terminated to the external storage apparatus 140, the SCM area 152 can be made available for use by another process and the limited capacity of the SCM 130 can be utilized in an effective manner.

Figure 6:
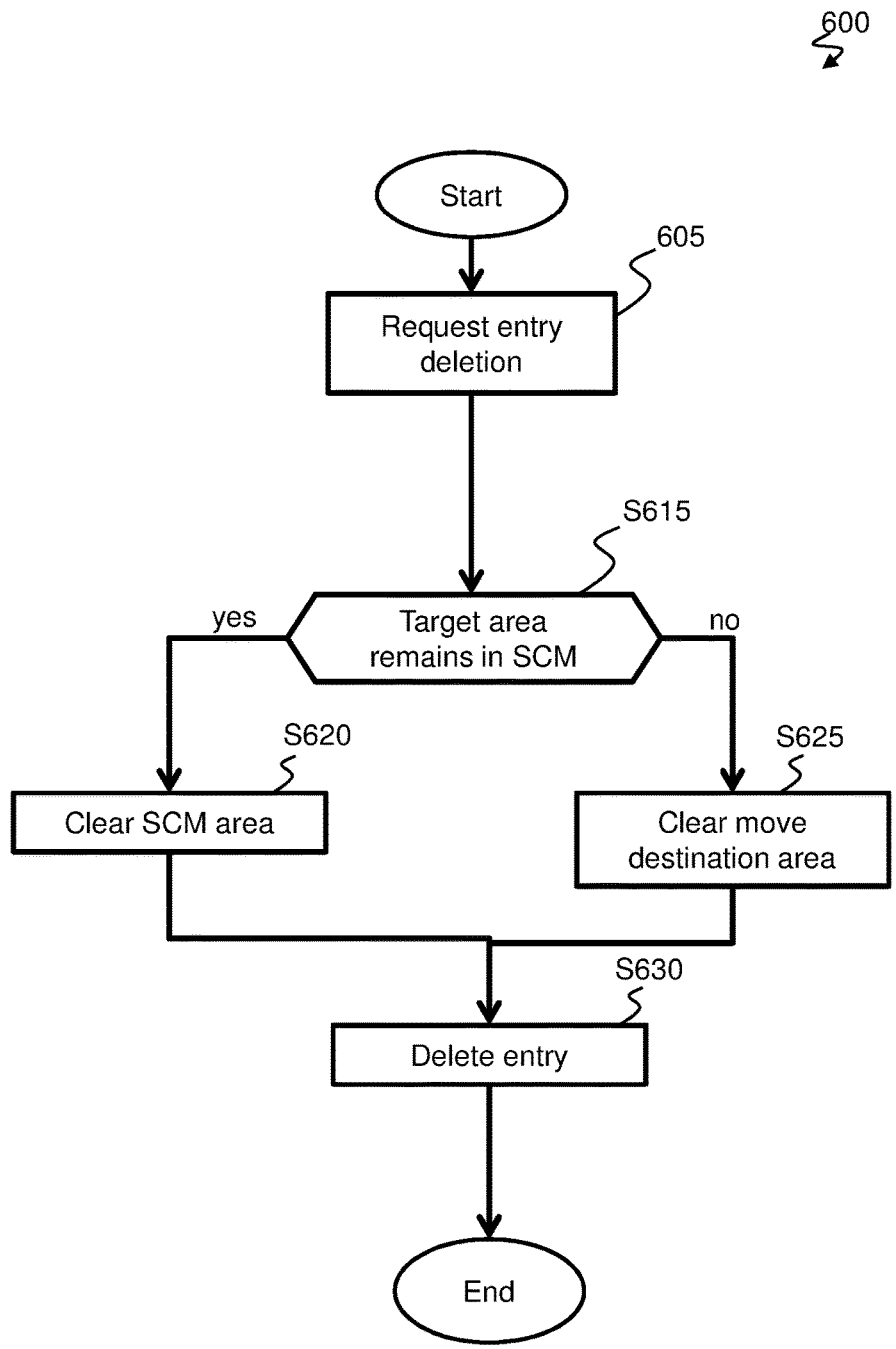
FIG. 6 shows an example of a flow chart of a data deletion process 600.

FIG. 6 shows an example of a flow chart of the data deletion process 600. The data deletion process 600 is a process which is started upon the SCM allocation management program 226 receiving a data deletion request.

In step 605, the SCM allocation management program 226 receives the data deletion request. The data deletion request may be transmitted via the SCM management unit 223 by the application program 221 executing the target process or may be transmitted by the OS 224 due to other factors. Cases where the OS 224 transmits the data deletion request include when target data has not been used for a long period of time. By deleting the target data, used capacities of the SCM 130, the external storage apparatus 140, and the ID map table 132 can be reduced. Moreover, the data deletion request includes data ID of the target data as additional information. In addition, other additional information may include authentication information and the like. The authentication information is verified by the OS 224 and enables a determination to be made on whether or not to delete data.

Moreover, in step 605, the SCM allocation management program 226 confirms that there is no process referring to the target data. The confirmation that there is no process referring to the target data may be made by the application program 221 that is a request source of the deletion request by communicating with a process other than the target process. In addition, the SCM management unit 223 may manage a reference counter storing the number of processes having transmitted an allocation request and the number of processes having transmitted a deletion request with respect to each piece of data, and make a determination based on the reference counter. Moreover, when the confirmation reveals that there is another process referring to the target data, the SCM allocation management program 226 notifies a transmission source of the request of an error and ends the process.

In step 615, the SCM allocation management program 226 refers to an entry of the target data in the ID map table 132 and determines whether the target data is stored in the process mapped SCM area 131 or in the external storage apparatus 140.

When the target data is stored in the process mapped SCM area 131 (S615; Yes), the SCM allocation management program 226 clears the process mapped SCM area 131 to zero (S620), and advances the process to step S630. On the other hand, when the target data is stored in the external storage apparatus 140 (S615; No), the SCM allocation management program 226 clears an area storing the target data in the external storage apparatus 140 to zero, and advances the process to step S630.

In step S630, the SCM allocation management program 226 deletes the entry 370 of the target data from the ID map table 132, and ends the process.

Moreover, even when a power interruption or a restart of the computer 200 occurs, since the ID map table 132 is stored in the SCM 130, contents thereof are retained. However, information on a PID and a virtual address which are normally not expected to be retained across a plurality of starts of a process need not be retained. Therefore, when restoring power or restarting the computer 200 after a power interruption, the OS 224 may delete contents of the PID 340 and the virtual address 340 in the ID map table 132.

According to the processes described above, unnecessary data can be deleted regardless of a storage location of the data being the SCM 130 or an external storage apparatus. In addition, by confirming whether or not a process other than a request source of the deletion request is using the target data, only data not being used by any process can be deleted.

In the present embodiment, by mapping the process mapped SCM area 131 in the SCM 130 to the SCM area 152 in the virtual address space 150 of a process, using a memory address translation function by the MMU 211, the application program 221 subsequently becomes capable of utilizing access means to a high-speed persistent storage medium which does not require involvement of an OS.

In addition, by issuing an SCM allocation request using a data ID, data for which an allocation request is issued to the OS 224 can be uniquely identified. Accordingly, regardless of an actual storage location of data being the SCM 130 or the external storage apparatus 140, the application program 221 can re-allocate data of a previous running of the application program 221 without being conscious of the storage location of the data.

In addition, by having a plurality of processes designate a same data ID, an SCM area can be shared. Furthermore, data can be moved to the external storage apparatus 140. Therefore, data equal to or larger than a capacity of the SCM 130 can be stored in a persistent storage medium and the limited capacity of the SCM 130 can be utilized in an effective manner.

While a configuration in which an OS runs as the OS 224 and the application program 221 runs on the OS 224 has been shown in the present embodiment, the present embodiment is also applicable to a configuration in which a hypervisor runs as the OS 224 and a virtual computer runs on the assumption that a process mapped area is an area allocated to the virtual computer.

Second Embodiment

Hereinafter, a second embodiment will be described. The second embodiment targets a computer system including a computer 800 to which virtual computer technology using a hypervisor or LPAR (Logical Partitioning) technology is applied. In the computer 800 to which virtual computer technology or LPAR technology is applied, an MMU executes multi-stage memory address translation. Hereinafter, a case where an SCM is referred to from an application program in an environment in which multi-stage memory address translation is executed will be described. Moreover, in the following description, same components and processes as the first embodiment will be denoted by the same reference characters and a description thereof will be omitted or simplified.

Figure 7:
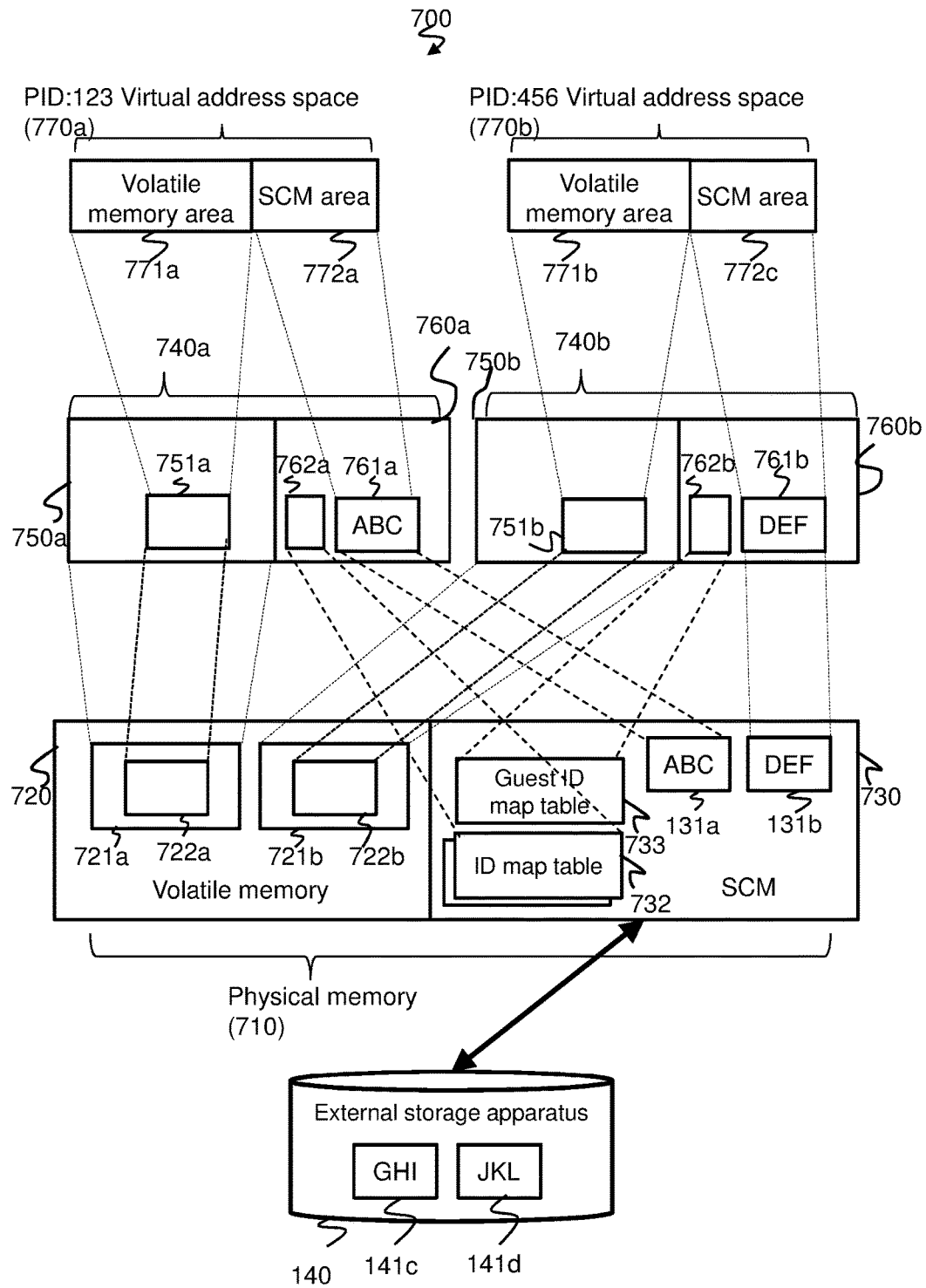
FIG. 7 is a diagram for illustrating an outline of a second embodiment.

FIG. 7 is a diagram for illustrating an outline of the second embodiment. Specifically, a mapping example 700 of a memory area of the computer 800 in a computer system is shown.

The computer 800 according to the second embodiment has a physical memory 710 including a volatile memory 720 and an SCM 730. A plurality of virtual computers run on the computer 800 using virtual computer technology or LPAR technology. In the present embodiment, an OS and a hypervisor run as an example of a system program.

The hypervisor generates two virtual computers respectively including guest physical memories 740a and 740b. The guest physical memory 740a includes a guest volatile memory area 750a and a guest SCM area 760a. The guest physical memory 740b includes a guest volatile memory area 750b and a guest SCM area 760b. An application program is executed on each virtual computer and a process runs on each application program.

Each of the processes includes a unique virtual address space 770a or 770b. The virtual address spaces 770a and 770b include volatile memory areas 771a and 771b and SCM areas 772a and 772b.

The hypervisor maps partial guest mapped areas 721a and 721b of the volatile memory 720 to the guest volatile memory areas 750a and 750b. In addition, the OS respectively maps partial areas 751a and 751b of the guest volatile memory areas 750a and 750b of the virtual computers to the volatile memory areas 771a and 771b. As a result, process mapped areas 722a and 722b in the guest mapped areas 721a and 721b are mapped to volatile memory areas 771a and 771b of a process.

In a similar manner, the hypervisor maps process mapped SCM areas 131a and 131b of the SCM 730 to partial areas 761a and 761b of guest SCM areas 760a and 760b of the respective virtual computers. In addition, the OS respectively maps the partial areas 761a and 761b of the guest SCM areas 760a and 760b of the virtual computers to the SCM areas 772a and 772b. As a result, process mapped SCM areas 131a and 131b in the SCM 730 are mapped to SCM areas 772a and 772b.

The mapping example 700 represents a state where a process with a PID of "123" has mapped, via the partial area 761a of the guest SCM area 760a, the process mapped SCM area 131a storing data with the data ID "ABC" to the SCM area 772a of the process' own virtual address space 770a. In addition, the mapping example 700 represents a state where a process with a PID of "456" has mapped, via the partial area 761b of the guest SCM area 760b, the process mapped SCM area 131b storing data with the data ID "DEF" to the SCM area 772b of the process' own virtual address space 770b.

A guest ID map table 733 and an ID map table 732 are stored in the SCM 730. The guest ID map table 733 is a table which associates the process mapped SCM areas 131a and 131b with the partial areas 761a and 761b in the guest SCM areas 760a and 760b.

The ID map table 732 exists for each virtual computer. The ID map table 732 is a table which associates the partial areas 761a and 761b in the guest SCM areas 760a and 760b with the process mapped SCM areas 131a and 131b. The hypervisor respectively maps the ID map table 732 of the virtual computers with partial areas 762a and 762b of the guest SCM areas 760a and 760b. Accordingly, the ID map table 732 of the respective virtual computers can be referred to and updated from the SCM allocation management program 226.

In a similar manner to the first embodiment, the computer system according to the second embodiment stores data not referred to by a process in areas 141a and 141b in the external storage apparatus 140.

Figure 8:
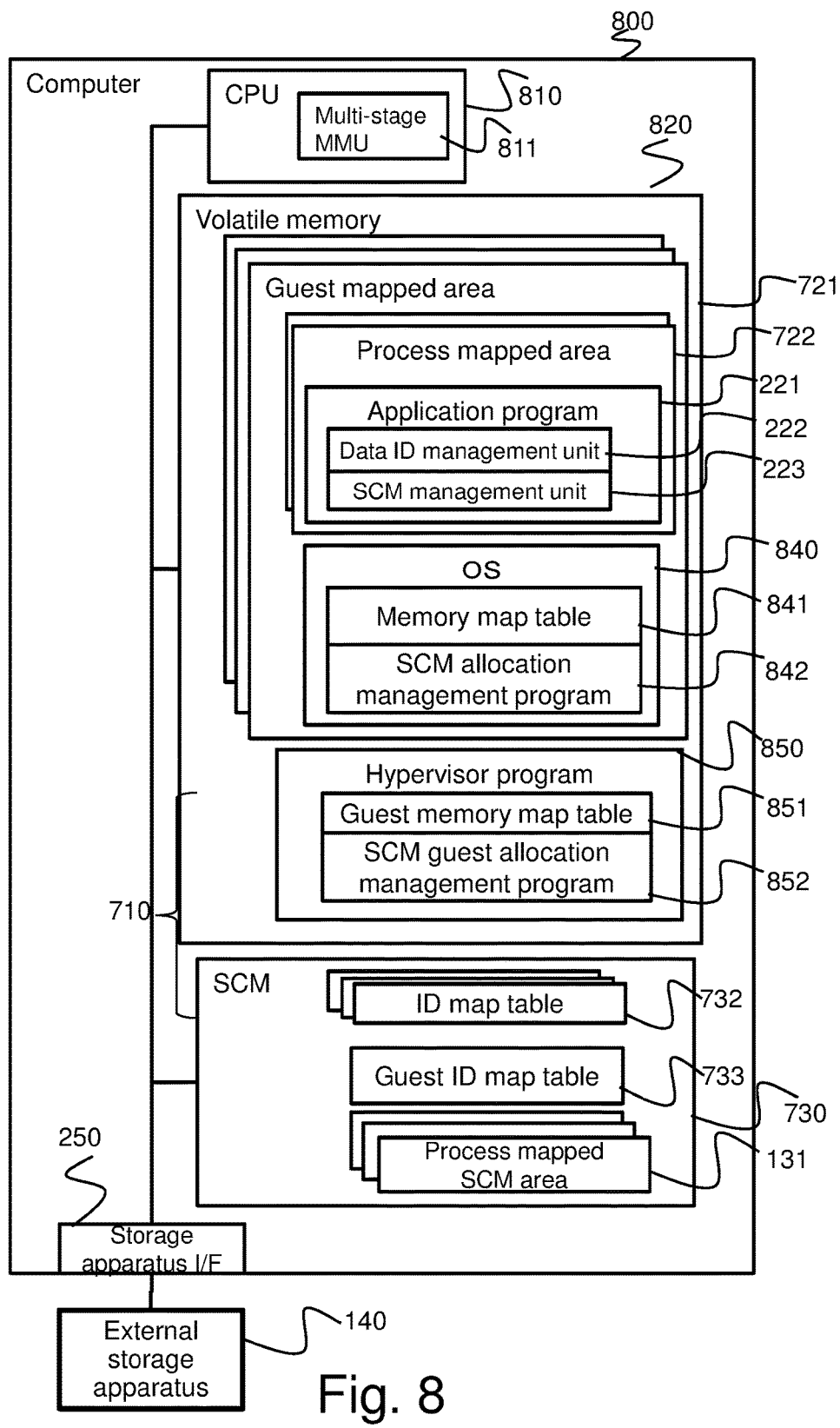
FIG. 8 is a configuration diagram of a computer system according to the second embodiment.

FIG. 8 is a configuration diagram of a computer system according to the second embodiment.

The computer system according to the present embodiment includes the computer 800 and the external storage apparatus 140 coupled to the computer. The computer 800 includes a CPU 810, a volatile memory 820, an SCM 830, and the storage apparatus interface 250.

The CPU 810 controls the respective components of the computer 800. The CPU 810 includes a multi-stage MMU 811. When an application program 221 refers to the physical memory 710, the multi-stage MMU 811 translates an address of a reference destination based on a correspondence relationship between addresses respectively stored in a memory map table 841 and a guest memory map table 851.

The volatile memory 820 includes a hypervisor program 850 and one or a plurality of guest mapped areas 721. The hypervisor program 850 is a program which controls the components of the computer 800. Specifically, the hypervisor program 850 is a program which executes a virtual computer on the computer 800. The hypervisor program 850 includes a guest memory map table 851 and an SCM guest allocation management program 852.

The guest memory map table 851 is a table which contains a correspondence relationship between a physical address and a guest physical address and which is used for address translation by the multi-stage MMU 821. The guest memory map table 851 corresponds to a table referred to as a page table or a segment table in conventionally known computers.

The SCM guest allocation management program 852 manages the guest ID map table 733. The SCM guest allocation management program 852 executes an SCM allocation process 1000, an SCM allocation release process 1100, and a data deletion process 1200 to be described later.

The guest mapped area 721 is an area in the volatile memory 820 which is generated for each virtual computer. One or a plurality of guest mapped areas 721 include one or a plurality of process mapped areas 722 and an OS 840.

The OS 840 includes the memory map table 841 and an SCM allocation management program 842. The memory map table 841 is a table which contains a correspondence relationship between a guest physical address and a virtual address and which is used for address translation by the multi-stage MMU 821. The memory map table 841 corresponds to a table referred to as a page table or a segment table in conventionally known virtual computers.

The SCM allocation management program 842 cooperates with the SCM guest allocation management program 852 to execute the SCM allocation process 1000, the SCM allocation release process 1100, and the data deletion process 1200 to be described later.

The process mapped area 722 is an area associated with the volatile memory area 771 in the virtual address space 770 of each process. One or a plurality of process mapped areas 722 include the application program 221. A configuration of the application program 221 is similar to that in the first embodiment.

The SCM 730 includes the guest ID map table 733, one or a plurality of ID map tables 732, and one or a plurality of process mapped SCM areas 131. The ID map table 732 is stored for each virtual computer. The process mapped SCM area 131 is an area corresponding to a process.

The ID map table 732 is a table representing an association between data and a storage area of the data. Moreover, the process mapped SCM area 131, the external storage apparatus 140, and the storage apparatus interface 250 are similar to those in the first embodiment.

FIG. 9 shows an example of the ID map table 732 according to the second embodiment. Each entry in the ID map table 732 according to the present embodiment includes the data ID 310 of the data, the size 320 of the data, the PID 330 of a process using the data, the virtual address 340 of the data in a virtual space, and a guest physical address 950 of the data in a guest SCM area. The items of the data ID 310, the size 320, the PID 330, and the virtual address 340 are similar to those of the ID map table 132 according to the first embodiment. Differences from the first embodiment are that a guest physical address of a guest physical area is associated with the data ID instead of a physical address and that an move destination is not associated with the data ID. Therefore, the ID map table 132 does not have an entry of which the guest physical address 950 is empty.

FIG. 10 shows an example of the guest ID map table 733 according to the second embodiment. The guest ID map table 733 has an entry for each piece of data. Each entry includes the data ID 310 of the data, the size 320 of the data, a guest ID 930 representing a virtual computer that is a storage destination of the data, a guest physical address 940 of the data in a guest SCM area, the physical address 350 of the data in the storage destination SCM 130, and the move destination 360 of the data in an external storage apparatus.

The items of the data ID 310, the size 320, the physical address 350, and the move destination 360 are similar to those of the ID map table 132 according to the first embodiment. The guest ID map table 733 includes the guest ID 930 in place of the PID 330 and the guest physical address 940 in place of the virtual address 340 in the ID map table 132.

Figure 11:
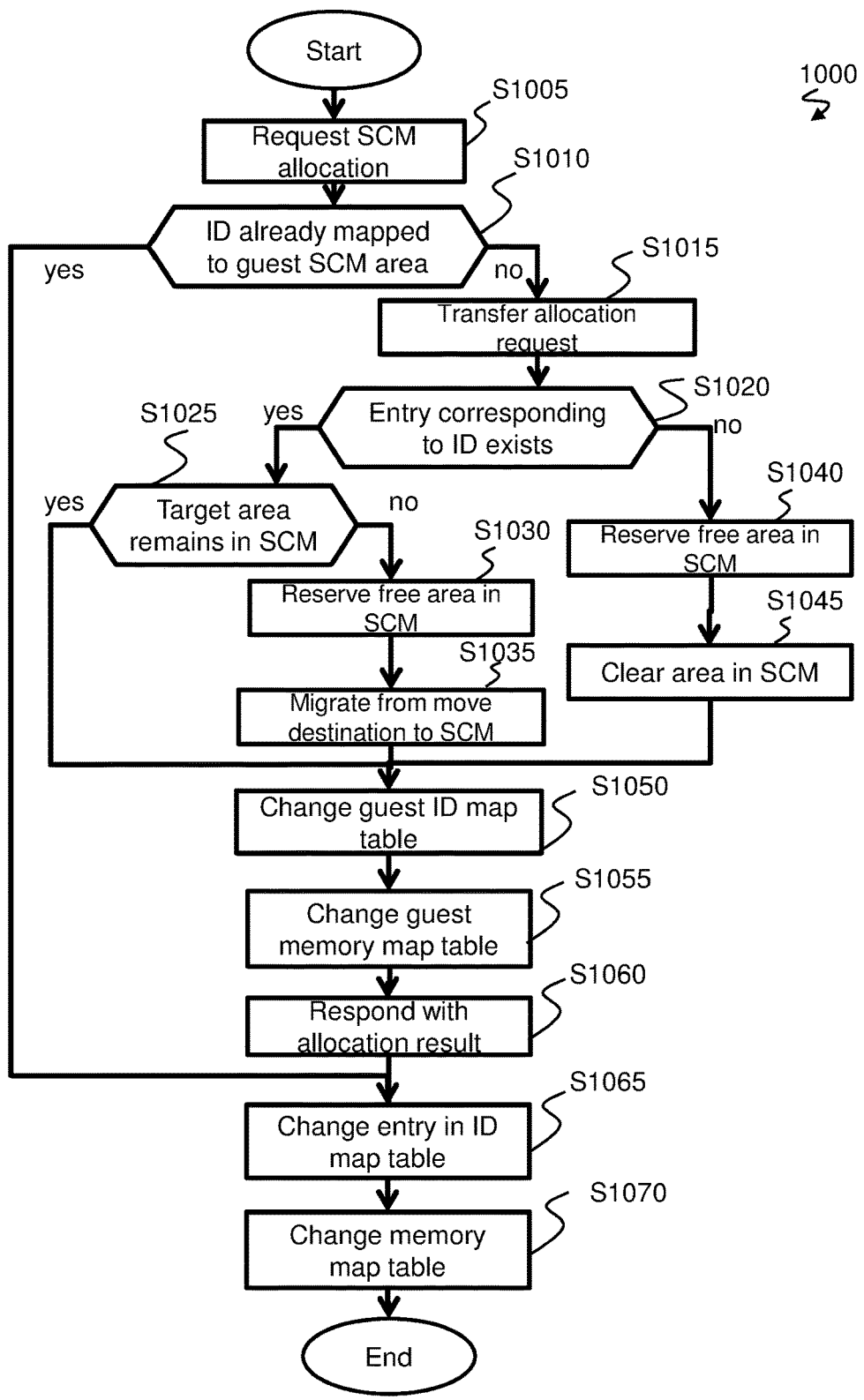
FIG. 11 shows an example of a flow chart of an SCM allocation process 1000 according to the second embodiment.

FIG. 11 shows an example of a flow chart of the SCM allocation process 1000 according to the second embodiment. The SCM allocation process 1000 is a process of mapping the process mapped SCM area 131 storing target data to the SCM area 772 using a data ID of the target data.

This process is started upon the SCM allocation management program 842 of the OS 224 receiving an allocation request of an SCM area (S1005). The allocation request is transmitted from the SCM management unit 223 in the application program 221. The allocation request may be explicitly performed by the SCM management unit 223 or may be performed by the OS 840 when starting the application program 221. The allocation request at least includes, as additional information, a PID of a target process and a data ID of target data. The additional information may also include a size, a mapping destination virtual address, and authentication information. The additional information is identical or similar to that in an allocation request according to the first embodiment.

In step S1010, the SCM allocation management program 842 refers to the ID map table 732 corresponding to its own virtual computer, searches for an entry corresponding to the data ID of the target data, and determines whether or not the entry exists. The existence of an entry of the target data (S1010; Yes) indicates that the target data is stored in the process mapped SCM area 131 of the SCM 730 and that the area 131 has already been mapped to the guest SCM area 761. In this case, mapping between the process mapped SCM area 131 and the guest SCM area 761 need not be performed once again. Therefore, the SCM allocation management program 842 advances the process to step S1065.

On the other hand, the absence of an entry corresponding to the data ID of the target data in the ID map table 732 (S1010; No) indicates that the target data is not stored in the computer system. In this case, the SCM allocation management program 842 transfers the allocation request to the SCM guest allocation management program 852 (S1015), and advances the process to step S1020. The transferred allocation request at least includes a guest ID of its own virtual computer and a data ID of the target data as additional information.

In step S1020, the SCM guest allocation management program 852 refers to the guest ID map table 733 and determines whether or not an entry corresponding to the data ID of the target data exists. When an entry of the target data exists in the guest ID map table 733 (S1020; Yes), the SCM guest allocation management program 852 advances the process to step S1025. On the other hand, when an entry of the target data does not exist in the guest ID map table 733 (S1020; No), the SCM guest allocation management program 852 advances the process to step S1040.

In step 1025, the SCM guest allocation management program 852 refers to the guest ID map table 733 and determines whether or not the target data exists in the SCM 730.

When an address is stored in the physical address 350 corresponding to the entry of the target data, the SCM guest allocation management program 852 determines that the target data exists in the SCM 730 (S1025; Yes). In this case, since there is no need to change the storage position of the target data, the SCM guest allocation management program 852 ends the process.

On the other hand, when an address is not stored in the physical address 350 corresponding to the entry of the target data and the address is stored in the move destination 360, the SCM guest allocation management program 852 determines that the target data exists in the external storage apparatus 140 (S1025; No), and advances the process to step S1030.

In step S1030, the SCM guest allocation management program 852 searches for a free area of the SCM 730 and, based on the guest ID map table 733, reserves a free area with a size equal to or larger than the size 320 of the target data as the process mapped SCM area 131. This process is similar to step 420 in the first embodiment.

In step S1035, the SCM guest allocation management program 852 migrates the target data in the external storage apparatus 140 to the free area (the process mapped SCM area 131) reserved in S1030.

Steps S1040 and S1045 are processes performed in a case where an entry of the target data does not exist in the guest ID map table 733 or, in other words, processes for storing new target data in the SCM 130. In step S1040, the SCM guest allocation management program 852 reserves a free area with a size equal to or larger than the size included in the allocation request. This process is similar to step S1030.

In step S1045, the SCM guest allocation management program 852 clears the free area reserved in S1040 to zero.

In step S1050, the SCM guest allocation management program 852 updates the guest ID map table 733. For example, when the target data is stored in the process mapped SCM area 131, a guest SCM area included in the virtual computer of the SCM guest allocation management program 852 is mapped to the process mapped SCM area 131. In addition, for example, when the target data is called from the move destination to the process mapped SCM area 131 (S1035), the SCM guest allocation management program 852 deletes the move destination 360 of the entry of the target data and adds the physical address 350 of the process mapped SCM area 131.

In addition, for example, when the target data is newly stored in the process mapped SCM area 131 (S1045), the SCM allocation management program 226 adds an entry of the target data to the ID map table 132.

Furthermore, the SCM guest allocation management program 852 adds or updates the entry 370 in the guest ID map table 733 based on the PID of the request source process of the allocation request and the virtual address of an allocation destination. This involves, for example, adding information on the virtual computer that is the request source and a guest physical address of the guest SCM area 761 of a mapping destination to the items of the guest ID 930, the guest physical address 940, and the physical address 350.

In step S1055, the hypervisor program 850 updates the guest memory map table 851 based on an allocation of the physical address 350 and the guest physical address 940 of the guest ID map table 733. Specifically, the hypervisor program 850 acquires a set of the physical address 350 and the guest physical address 940 from the entry of the target data in the guest ID map table 733, and writes the set into the guest memory map table 851.

In step S1060, the SCM guest allocation management program 852 responds to the SCM allocation management program 842 with a result of the allocation. This response includes whether the allocation of the guest SCM area 761 has succeeded or failed and, when the allocation has succeeded, a guest physical address of the area 761.

In step 1065, the SCM allocation management program 842 updates the ID map table 732. At this point, the target data has already been made referable on the guest SCM area 761. Therefore, the SCM allocation management program 842 adds or changes the entry 370 of the target data ID in the ID map table 732 corresponding to the request source virtual computer.

In step 1070, the OS 840 updates the memory map table 225 based on the virtual address 340 and the guest physical address 950 of the entry of the target data in the ID map table 732, and ends the process. Specifically, the OS 840 acquires a set of the virtual address 340 and the guest physical address 950 from the entry of the target data in the ID map table 732, and writes the set into the memory map table 225.

According to the processes described above, even when the application program 221 runs on a virtual computer, an area in the SCM in which data is actually stored can be allocated to the virtual address space 770 of the application program 211. In other words, by reserving a guest SCM area on the virtual computer and allocating a virtual address space to a physical area in an SCM via the guest SCM area, a similar effect to the computer system according to the first embodiment can be obtained.

In addition, when the application program is not normally terminated due to a power interruption or the like, performing an SCM allocation request by adding a same data ID as a previous running of the application program 221 causes the process mapped SCM area 131 storing the same data as the previous running to be allocated to the SCM area 772 via the guest SCM area 761 and enables the data to be used in a previous state.

The OS can immediately restore the memory map table 841 and the guest memory map table 851 based on the ID map table 732 and the guest ID map table 733. Accordingly, by having the multi-stage MMU 810 translate a virtual address into a physical address via a guest address using the guest memory map table 851 and the memory map table 841, the application program 221 can access the process mapped SCM area that had been used prior to restart.

In addition, since the ID map table 732 and the guest ID map table 733 are stored in the SCM 730, contents thereof are retained even in the event of a power interruption or a restart of the computer 800. Therefore, even when a power interruption or a restart unexpectedly occurs in the computer 800, by having the restarted application program 221 once again perform an SCM allocation request using the same data ID, data prior to the occurrence of the power interruption or restart of the computer 800 can be restored immediately.

Furthermore, data stored in the external storage apparatus 140 can be read to the process mapped SCM area 731. Accordingly, data can be appropriately managed even when a total amount of data used by an application exceeds the capacity of the SCM 730. In other words, by having the external storage apparatus 140 and the SCM 730 cooperate with each other, a semblance that data equal to or exceeding the capacity of the SCM 730 is stored in an SCM can be presented to the application program 221.

Figure 12:
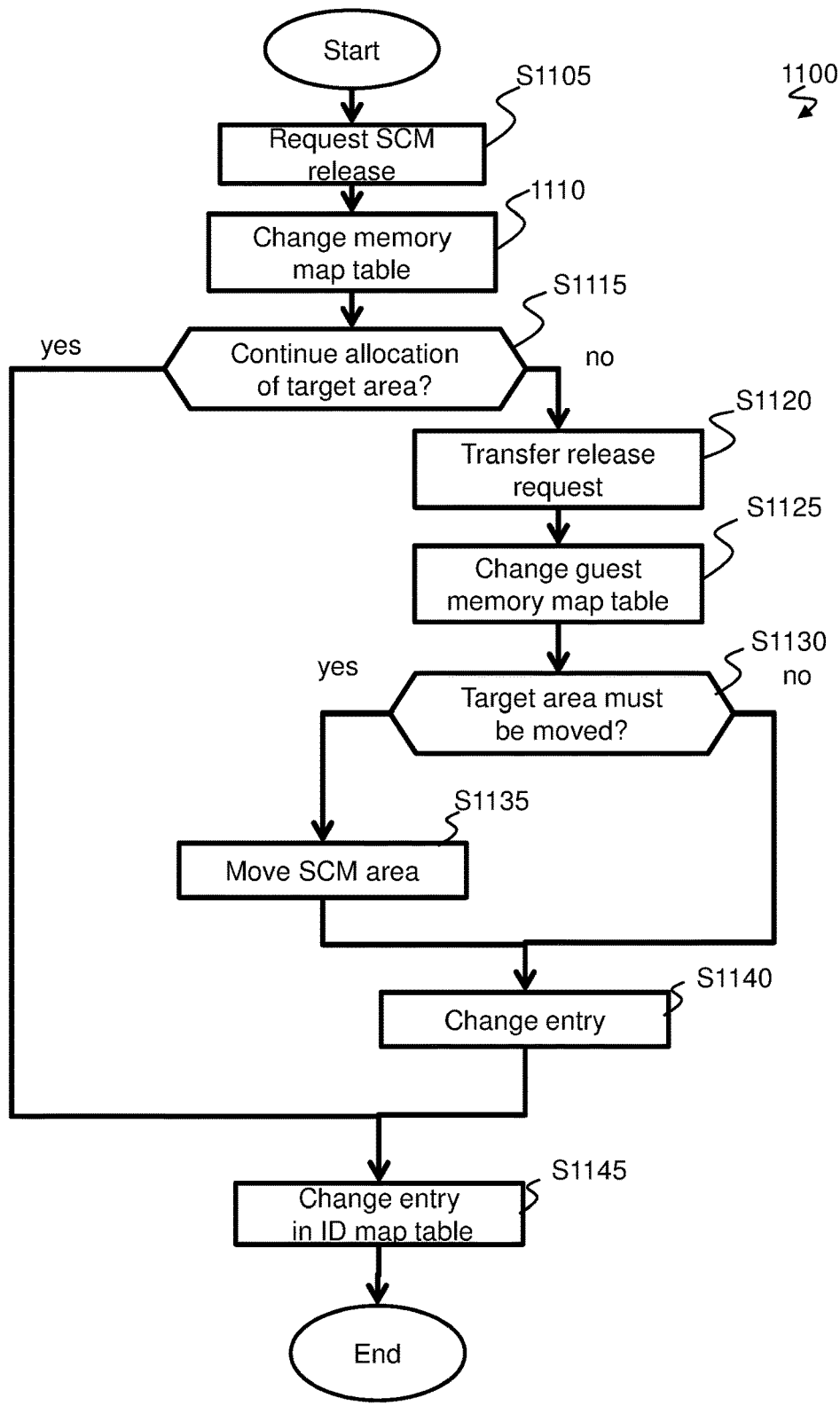
FIG. 12 shows an example of a flow chart 1100 of an SCM allocation release process.

FIG. 12 shows an example of a flow chart 1100 of an SCM allocation release process.

The SCM allocation release process 1100 is a process of releasing mapping of the process mapped SCM area 131 storing target data corresponding to a data ID to the SCM area 772.

This process is started upon the SCM allocation management program 842 of the OS 840 receiving a release request of an SCM area (S1105). The release request is transmitted from the SCM management unit 223 in the application program 221.

However, due to other factors, the release request may be issued by the OS 840 or the hypervisor program 850. The OS 840 issues the release request in a case where, for example, the application program 221 is abnormally terminated as a result of a fault, and the hypervisor program 850 issues the release request in a case where, for example, an allocation release request cannot be transmitted from the application program 221 such as when the application program 221 is forcibly terminated in accordance with maintenance of the computer 800 or the like. Moreover, additional information included in the release request is similar to that in the first embodiment.

In step S1110, the OS 840 searches for the entry 370 corresponding to the data ID of the target data included in the release request in the ID map table 132, refers to the virtual address 340 of the SCM area and the guest physical address 950 of the guest SCM area, and releases the mapping of the virtual address and the guest physical address in the memory map table 225.

In step S1115, the SCM allocation management program 842 determines whether mapping of a target SCM area storing the target data included in the release request and a target guest SCM area is to be released or continued.

When it is determined that the mapping is to be released (S1115; No), the SCM allocation management program 842 transfers the release request to the SCM guest allocation management program 852 (S1120), and advances the process to S1125. Moreover, the release request includes a guest ID of the request source virtual computer and a data ID of the target data as additional information. On the other hand, when it is determined that the mapping is not to be released (S1115; Yes), the SCM allocation management program 842 advances the process to step S1145.

Moreover, usually, based on the release request, the SCM allocation management program 842 determines to release the mapping of the target SCM area and the target guest SCM area. Cases where a determination is made not to release the mapping include a case where the entry 370 in the ID map table 732 corresponding to the data ID included in the release request includes a PID of a process other than the target process included in the release request. In this case, there is another process that corresponds to the target guest SCM area 761.

In step S1125, the hypervisor program 850 searches for the entry 370 corresponding to the data ID included in the release request and the guest ID of the request source virtual computer in the guest ID map table 733, refers to the guest physical address 940 and the physical address 350, and releases the mapping of the guest physical address and the physical address in the guest memory map table 851.

In step S1130, the SCM guest allocation management program 852 determines whether to move the target data in the process mapped SCM area 131 to the external storage apparatus 140 or to leave the target data in the process mapped SCM area 131.

When it is determined that the target data is to be moved to the external storage apparatus 140 (S1130; Yes), the SCM guest allocation management program 852 moves the target data to a free area of the external storage apparatus 140 (S1135), and advances the process to S1140. On the other hand, when it is determined that the target data is to be left in the process mapped SCM area 131 (S1130; No), the SCM guest allocation management program 852 advances the process to S1140 without migrating the target data.

There are several conceivable cases where the target data is left in the process mapped SCM area 131. These are cases where, for example, the additional information in the release request specifies that the target data be moved to the external storage apparatus 140. Other cases include, for example, when the target process mapped SCM area is being mapped by another virtual computer and when the SCM 730 has sufficient capacity and the target process mapped SCM area need not be immediately changed to a free area.

On the other hand, cases where the target data in the target process mapped SCM area is moved to the external storage apparatus 140 include, for example, when the additional information in the release request specifies that the target data be moved to the external storage apparatus 140. Other cases include, for example, when there is a shortage of free area in the SCM 730 and when it is estimated that there is some time until a next allocation request of the target data is issued based on an operation log of the target process or the virtual computer or the like.

In step 1140, the SCM guest allocation management program 852 updates contents of the entry of the target data in the ID map table 733. Specifically, for example, the SCM guest allocation management program 852 deletes the guest ID 930 and the guest physical address 940 from the target entry. In addition, when the target data is moved to the external storage apparatus 140 in step S1135, a field of the physical address 350 of the entry of the target data is deleted and an address of an area storing the target data is added to the move destination 360.

According to the processes described above, even when the application program 221 runs on a virtual computer, a similar effect to the first embodiment can be obtained. In other words, the SCM area 152 can be released in an appropriate manner both when the application program 221 runs normally and when the application program 221 is abnormally terminated due to whatever reason.

In addition, contents in the SCM area 772 can be continuously retained in the SCM 730 or moved to the external storage apparatus 140. Due to the series of operations, particularly, even when the application program 221 is abnormally terminated, data stored in the SCM 730 prior to the termination is continuously stored.

Furthermore, when another process requires the capacity of the SCM area 772, by migrating data in the SCM area 772 being used by a process to be terminated to the external storage apparatus 140, the SCM area 772 can be made available for use by the other process and the limited capacity of the SCM 130 can be utilized in an effective manner.

Figure 13:
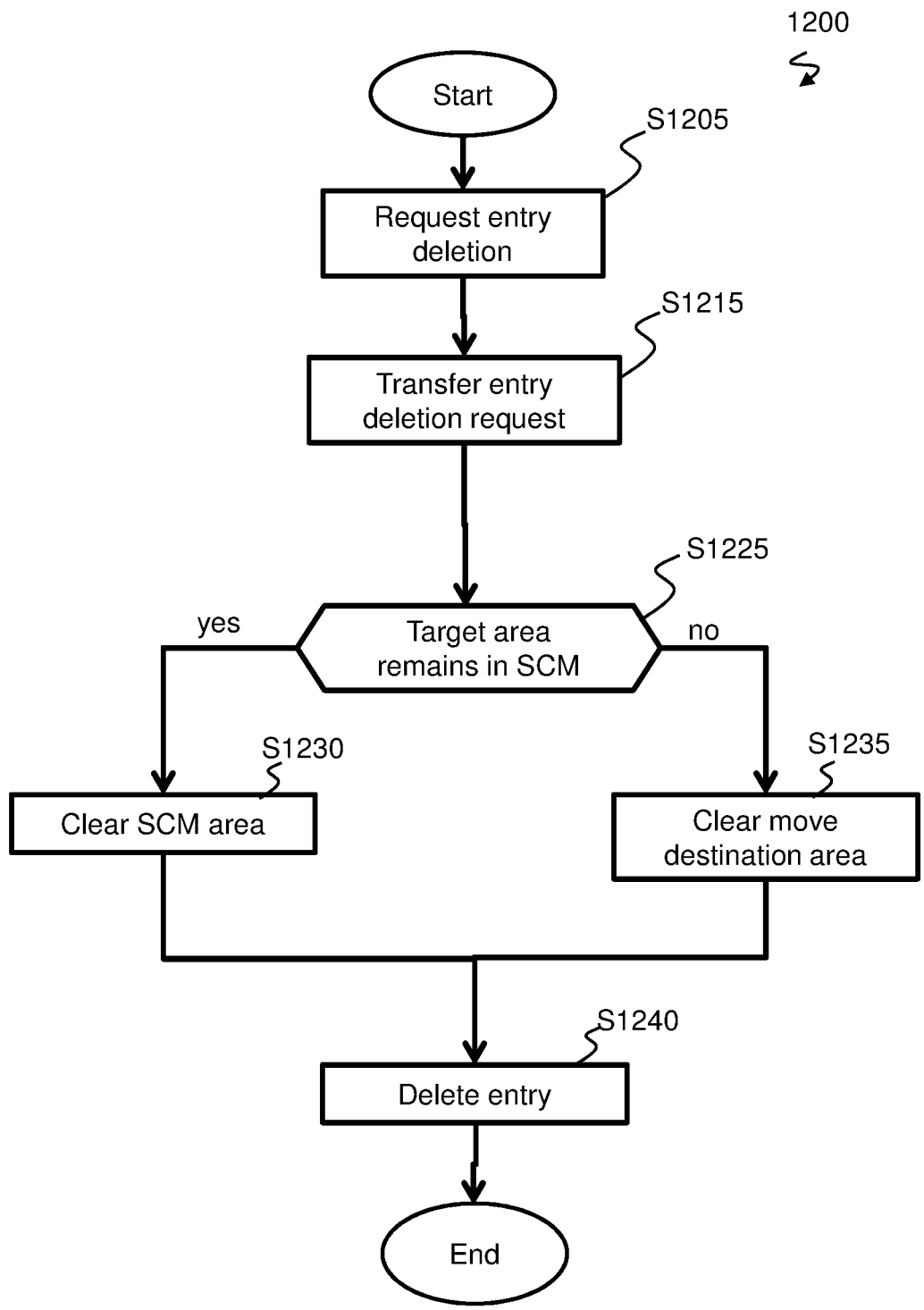
FIG. 13 shows an example of a flowchart of a data deletion process 1200 according to the second embodiment.

FIG. 13 shows an example of a flowchart of the data deletion process 1200 according to the second embodiment. The data deletion process 1200 is a process which is executed upon the SCM allocation management program 842 receiving a data deletion request.

In step S1205, the SCM allocation management program 842 receives the data deletion request. The data deletion request may be transmitted via the SCM management unit 223 by the application program 221 executing the target process or may be transmitted by the OS 840 or the hypervisor program 850 due to other factors. Examples in which the OS 840 or the hypervisor program 850 makes the request include a case where data has not been used for a long period of time in a similar manner to the first embodiment. The data deletion request includes the data ID of the target data as additional information. In addition, other additional information may include authentication information and the like. The authentication information can be used to determine whether or not to delete data by having the OS 840 or the hypervisor program 850 verify contents of the authentication information.

Moreover, in step S1205, the SCM allocation management program 842 confirms that there is no process referring to the target data in the same virtual computer. The confirmation that there is no process referring to the target data may be made by the application program 221 that is a request source of the deletion request by communicating with a process other than the target process.

In addition, the SCM management unit 223 may manage a reference counter storing the number of processes having transmitted an allocation request and the number of processes having transmitted a deletion request with respect to each piece of data, and make a determination based on the reference counter. Moreover, when the confirmation reveals that there is another process referring to the target data, the SCM allocation management program 842 notifies a transmission source of the request of an error and ends the process.

In step S1215, the SCM allocation management program 842 transfers the data deletion request to the SCM guest allocation management program 852. This request includes a guest ID of the request source virtual computer and the data ID of the target data as additional information.

Moreover, the SCM guest allocation management program 852 confirms that there is no other virtual computer referring to the target data. The confirmation that there is no virtual computer referring to the target data may be made by communicating with a virtual computer other than the virtual computer that is the request source of the deletion request.

In addition, the SCM guest allocation management program 852 may manage a reference counter storing the number of virtual computers having transmitted an allocation request and the number of virtual computers having transmitted a deletion request with respect to each piece of data, and make a determination based on the reference counter. Moreover, when the confirmation reveals that there is another virtual computer referring to the target data, the SCM guest allocation management program 852 notifies a transmission source of the request of an error and ends the process.

In step S1225, the SCM guest allocation management program 852 refers to an entry of the target data in the guest ID map table 733 and determines whether the target data is stored in the process mapped SCM area 131 or in the external storage apparatus 140.

When the target data is stored in the process mapped SCM area 131 (S1225; Yes), the SCM guest allocation management program 852 clears the process mapped SCM area 131 to zero (S1230), and advances the process to step S1240.

On the other hand, when the target data is stored in the external storage apparatus 140 (S1225; No), the SCM guest allocation management program 852 clears an area storing the target data in the external storage apparatus 140 to zero (S1235), and advances the process to step S1240.

In step S1240, the SCM guest allocation management program 852 deletes the entry 370 of the target data from the guest ID map table 733, and ends the process.

Moreover, even when a power interruption or a restart of the computer 800 occurs, since the ID map table 732 and the guest ID map table 733 are stored in the SCM 730, contents thereof are retained. However, information on the PID 340, the virtual address 340, the guest physical addresses 940 and 950, and the guest ID 730 which are normally not expected to be retained across a plurality of starts of a process need not be retained. Therefore, when restoring power or restarting the computer 800 or restarting a virtual computer after a power interruption, the OS 840 and the hypervisor program 850 may delete contents of the PID 340, the virtual address 340, the guest physical addresses 940 and 950, and the guest ID 730.

According to the processes described above, even when the application program 221 runs on a virtual computer, a similar effect to the first embodiment can be obtained. In other words, unnecessary data can be deleted from a storage location regardless of the storage location being the SCM 730 or the external storage apparatus 140. By confirming whether or not a process other than a request source of the deletion request is using the target data, only data not being used by all of the processes can be deleted.

In the present embodiment, by mapping the process mapped SCM area 131 in the SCM 730 to the SCM area 772 in the virtual address space 770 via the guest SCM area 761 in the guest SCM 760 of a virtual computer, even when the application program 221 runs in the virtual computer, the application program 221 subsequently becomes capable of, using a memory address translation function by the multi-stage MMU 811, utilizing access means to a high-speed persistent storage medium which does not require involvement of an OS and a hypervisor.

In addition, by issuing an SCM allocation request using a data ID, data for which an allocation request is issued to the OS 840 and the hypervisor program 850 can be uniquely identified.

Accordingly, regardless of an actual storage location of data being the SCM 130 or the external storage apparatus 140, the application program 221 can re-allocate data of a previous running of the application program 221 without being conscious of the storage location of the data.

In addition, by having a plurality of processes designate a same data ID, an SCM area can be shared. Furthermore, data can be moved to the external storage apparatus 140. Therefore, data equal to or larger than a capacity of the SCM 730 can be stored in a persistent storage medium and the limited capacity of the SCM 730 can be utilized in an effective manner.

Moreover, while only a configuration in which memory address translations are performed twice among a physical memory, a guest physical memory, and a virtual address space is described in the present embodiment, memory address translations may be performed three times or more by arranging an ID map table and a memory map table in numbers corresponding to the number of address translations and transferring an allocation request and a release process request of an SCM a plurality of times.

Third Embodiment

Hereinafter, a third embodiment will be described. The third embodiment targets a computer system in which a plurality of computers respectively including a physical memory and an SCM run in cooperation with each other. This computer system enables migration of a process being executed among the plurality of computers.

Moreover, in the following description, same components and processes as the first embodiment will be denoted by the same reference characters and a description thereof will be omitted or simplified.

Figure 14:
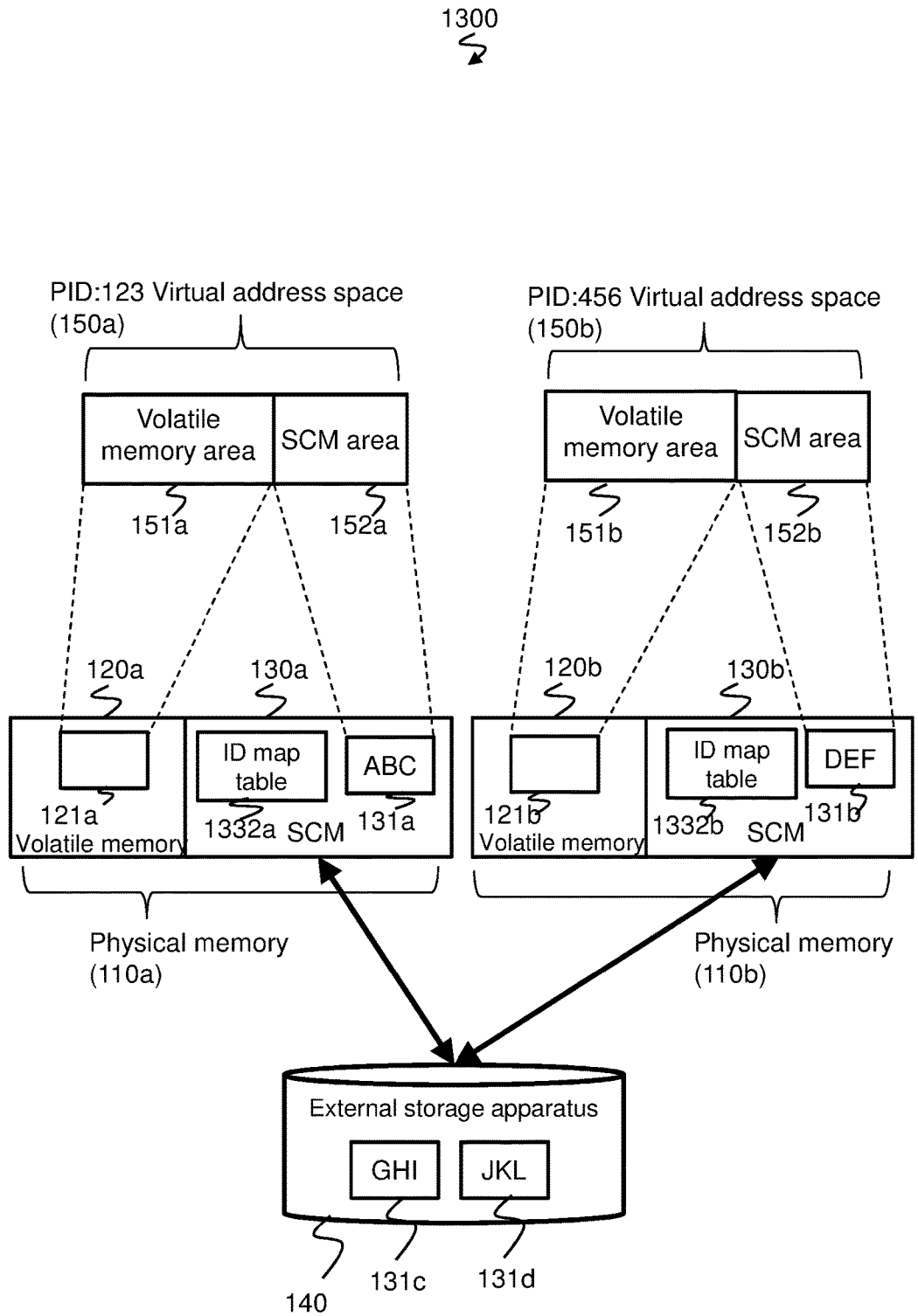
FIG. 14 is a diagram for illustrating an outline of a third embodiment.

FIG. 14 is a diagram for illustrating an outline of the third embodiment. Specifically, a mapping example 1300 of a memory area of a computer 1400 in a computer system is shown. The mapping example 1300 represents an example in which two computers 800 are provided. A computer 1400*a* includes a volatile memory 120*a* and an SCM 130*a*. A computer 1400*b* includes a volatile memory 120*b* and an SCM 130*b*. The volatile memories 120*a* and 120*b* and the SCMs 130*a* and 130*b* will be collectively referred to as physical memories 110*a* and 110*b*. A plurality of processes run using the physical memories 110*a* and 110*b*.

A relationship between the respective physical memories 110*a* and 110*b* and virtual address spaces 150*a* and 150*b* of respective processes (with PIDs "123" and "456") are similar to the relationship in the mapping example 100 according to the first embodiment. Specifically, the volatile memory areas 151*a* and 151*b* of the processes are respectively mapped by an OS to process mapped areas 121*a* and 121*b* in the volatile memories 120*a* and 120*b*. In addition, the SCM areas 152*a* and 152*b* of the processes are respectively mapped by the OS to process mapped SCM areas 131*a* and 131*b* in the SCMs 130*a* and 130*b*.

The SCMs 130*a* and 130*b* of the computers respectively include ID map tables 1332*a* and 1332*b*. CPUs of the computers respectively synchronize the ID map tables 1332*a* and 1332*b* with each other. Accordingly, contents of the ID map tables 1332*a* and 1332*b* become the same. In addition, the external storage apparatus 140 is shared by a plurality of computers.

Moreover, the virtual address space 150 (the volatile memory area 151 and the SCM area 152) of a process executed by an application program on one computer is mapped to a physical memory of the computer.

Figure 15:
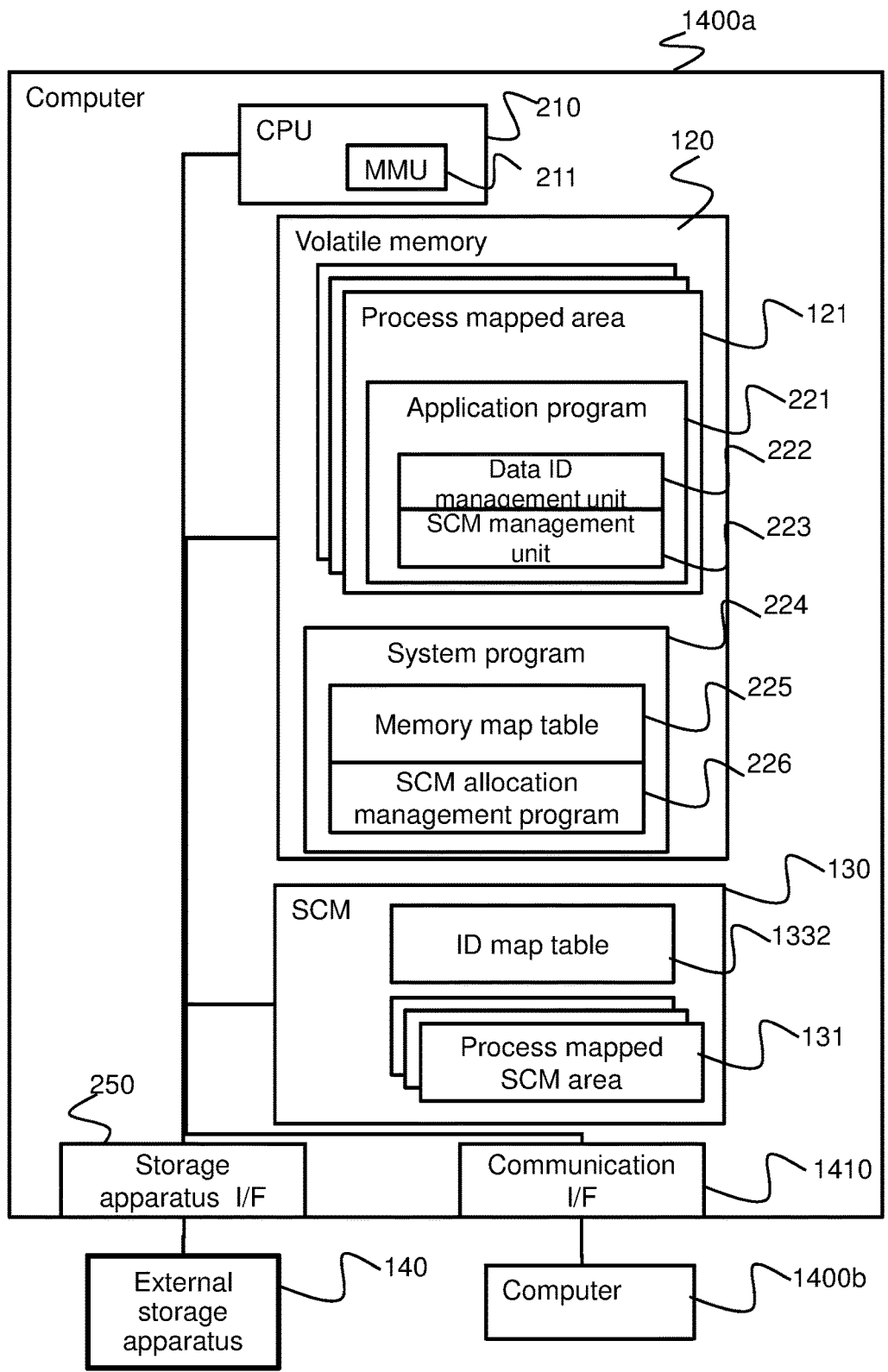
FIG. 15 is a configuration diagram of a computer system according to the third embodiment.

FIG. 15 is a configuration diagram of a computer system according to the third embodiment. A difference from the first embodiment is that each computer 1400 includes a communication interface 1410 which couples the computer 1400 to another computer. Other components of each computer are similar to those of the computer 200 according to the first embodiment.

The communication interface 1410 is an interface which communicates with other computers 1400 sharing a similar configuration to transmit and receive data. Examples of the communication interface 1410 include an NIC (Network Interface Card), a Fibre Channel HBA (Host Bus Adapter), and an Infiniband. While the computer 1400a and the computer 1400b are directly coupled to each other via the communication interface 1410 in the present example, three or more computers 1400 may be mutually coupled to one another using a switch or the like. Moreover, the external storage apparatus 140 is not only coupled to the computer 1400a but also coupled to the computer 1400b.

FIG. 16 shows an example of the ID map table 1332 according to the third embodiment. An entry of the ID map table 1332 according to the present embodiment includes a storage destination computer 1550 of data. The storage destination computer 1550 is an identifier which uniquely identifies a computer that is a storage destination of the data. Other items of the entry are similar to those of the first embodiment.

Figure 17:
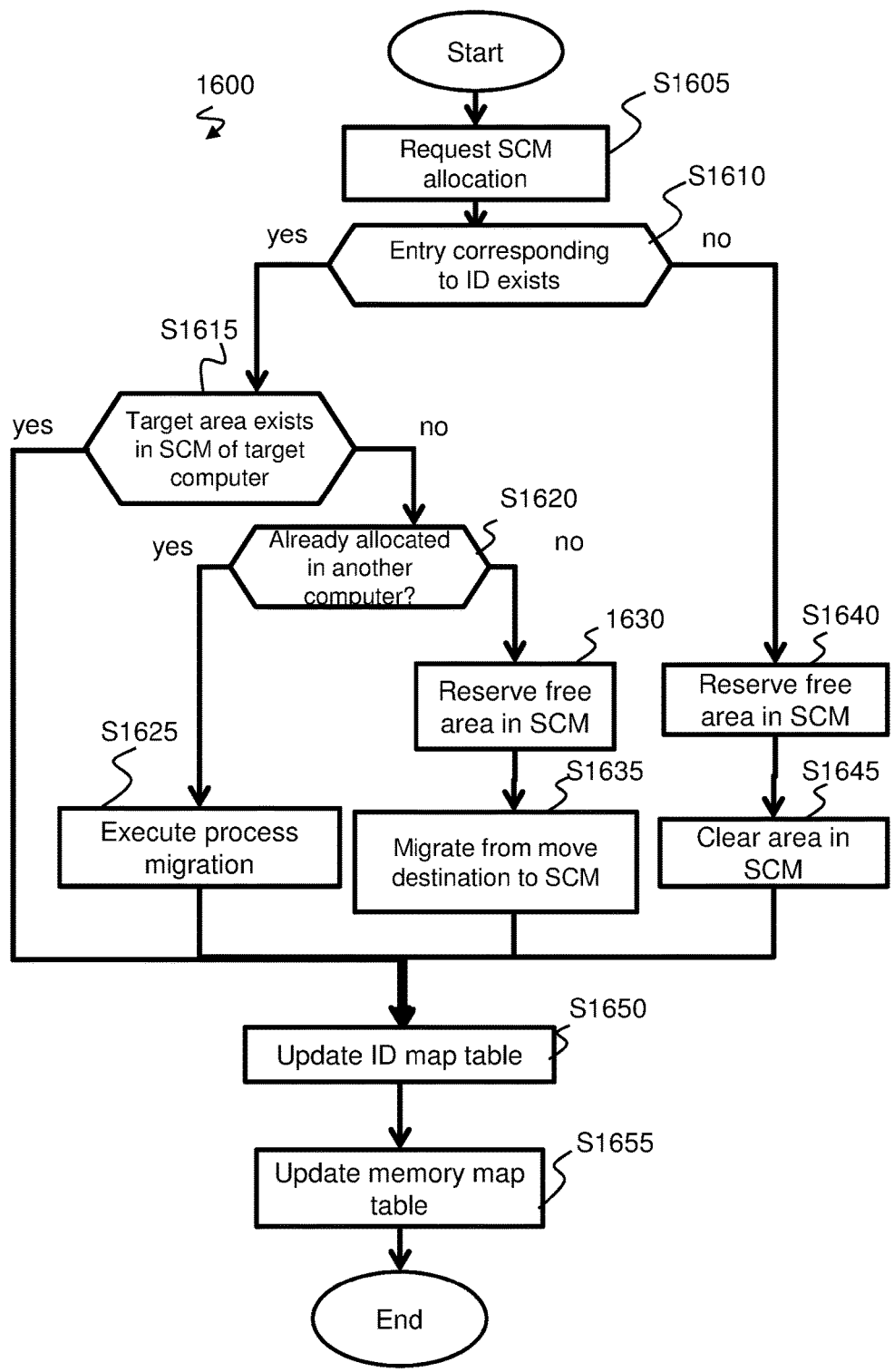
FIG. 17 shows an example of a flow chart of an SCM allocation process 1600 according to the third embodiment.

FIG. 17 shows an example of a flow chart of an SCM allocation process 1600 according to the third embodiment. The SCM allocation process 1600 is a process of mapping the process mapped SCM area 131 storing target data to the SCM area 152 using a data ID of the target data.

Steps S1605, S1610, S1630, S1635, S1640, and S1645 are similar to steps S405, S410, S420, S425, S430, and S435 of the first embodiment.

When an entry of the target data exists in the ID map table 1332 (S1610; Yes), the SCM allocation management program 226 refers to the target entry in the ID map table 1332 and determines whether or not the storage destination computer 1550 of the target data is its own computer (in other words, the computer executing a process that is a request source of an allocation request).

When the storage destination computer of the target data is its own computer (S1615; Yes), since the target data exists in its own SCM, the SCM allocation management program 226 need not change a storage position of the target data. Therefore, the SCM allocation management program 226 ends the process. On the other hand, when the storage destination computer of the target data is a computer other than its own computer (S1615; Yes), the SCM allocation management program 226 advances the process to step S1620.

In step 1620, the SCM allocation management program 226 refers to the storage destination computer 1550 and the move destination 360 of the entry of the target data in the ID map table 1332 and determines whether the target data is located in the SCM 130 of another computer or in the external storage apparatus 140.

When the target data exists in the SCM 130 of another computer (S1620; Yes), the SCM allocation management program 226 advances the process to step S1625. On the other hand, when the target data exists in the external storage apparatus 140 (S1620; No), the SCM allocation management program 226 advances the process to step S1630.

In step S1625, the SCM allocation management program 226 migrates the target process having issued the allocation request to the computer that is the storage destination of the target data. Moreover, a technique such as process migration accompanied by memory copying can be applied when migrating a process between computers.

In step S1650, the SCM allocation management program 226 updates the ID map table. For example, when the target data is called from the move destination to the process mapped SCM area 131 (S1635), the SCM allocation management program 226 deletes the move destination 360 of the entry of the target data and adds the physical address 350 of the process mapped SCM area 131.

In addition, for example, when the target data is newly stored in the process mapped SCM area 131 (S1645), the SCM allocation management program 226 adds an entry of the target data to the ID map table 132. Furthermore, for example, when the target process is migrated to the computer that is the storage destination of the target data (S1625), the SCM allocation management program 226 adds the PID 330 of the migration source process to the entry of the target data.

Moreover, the SCM allocation management program 226 changes the PID 330 of the request source process of the allocation request and the virtual address 340 of the SCM area as appropriate. In addition, in S1625, when the target data is migrated to a computer that is an execution destination of the target process, the SCM allocation management program 226 changes the storage destination computer 1550 and the physical address 350 of the entry of the target data.

In step S1655, the OS 224 updates the memory map table 225 based on an allocation of the virtual address 340 and the physical address 350 of the ID map table 1332, and ends the process. Specifically, based on the ID map table 1332, the OS 224 writes a set of a virtual address and a physical address into the memory map table 225.

According to the processes described above, even in a computer system including a plurality of computers, a similar effect to the first embodiment can be obtained. In the allocation process according to the present embodiment, even when a computer executing a process that is a request source of an allocation request of target data differs from a computer in which a virtual space corresponding to the target data is already allocated to a process mapped SCM area, by migrating the process that is the request source to the computer that is a storage destination of the target data, the allocation process need not be performed by the computer executing the request source process. In addition, data can be shared by a plurality of processes and the plurality of processes using the data can be collectively managed by one computer.

Moreover, a release process of an SCM according to the present embodiment is similar to the SCM allocation release process 500 according to the first embodiment. Accordingly, due to an operation of the SCM allocation process 1600, a process referring to a single piece of data is to be allocated onto the SCM 130 of a single computer 1400. Therefore, when a program running on the computer issues an allocation release process of an SCM, release of an allocation can be completed by following the operation of the SCM allocation release process 500.

In addition, when there is an allocation release request with respect to an SCM of 1400 of another computer, the computer 1400 having received the allocation release request may be configured to transfer a division release request to the computer 1400 to which an SCM is allocated. In this case, the computer 1400 having received the transfer may be configured to execute the release process 500.

When a plurality of processes map the same SCM area 131 to virtual address spaces, the plurality of processes run on the same computer 1400 in order to refer to the SCM area 131. However, when the allocation of the SCM area 131 is released by a release process, the process of which an allocation is released may be migrated to another computer 1400.

A deletion process according to the present embodiment is similar to the data deletion process 600 according to the first embodiment. When receiving a deletion request of data in an SCM of another computer 1400, the computer 1400 having received the deletion request may transfer the deletion request to the computer 1400 including the data. Accordingly, the computer 1400 having received the transferred deletion request may be configured to execute the deletion process 600.

Fourth Embodiment

Hereinafter, a fourth embodiment will be described. The computer system according to the fourth embodiment includes a plurality of computers. A configuration and a mapping example of the computer system are similar to those of the first embodiment.

The computer system has a plurality of computers 200 respectively including the SCM 130. A case where the SCM 130 having been used in first computer 200 is extracted and added to a second computer will now be assumed. The second computer 200 is to include both a second SCM 130 originally included in the second computer 200 and a first SCM 130 extracted from the first computer 200 and added to the second computer 200. The first and second SCMs respectively contain the ID map table 132. The first and second computers manage their respective physical memories using different physical addresses.

Therefore, the physical address of a first ID map table after addition which is contained in the second SCM does not indicate a valid physical address in the second computer 200. In this case, the SCM allocation management program 226 performs a connection process of ID map tables respectively contained in the first and second SCMs to create a unified ID map table using valid physical addresses.

For example, let us assume that, when the SCM 130 arranged at a physical address X in the first computer is added to the second computer, the SCM 130 is arranged at a physical address Y in the second computer. In this case, the SCM allocation management program 226 performs an address translation process in which (Y-X) is added to the address in the physical address 350 with respect to each entry in the ID map table in the first SCM 130. Accordingly, information of the ID map table in the first SCM can be appropriately added to the ID map table in the second SCM originally included in the second computer. Therefore, in subsequent processes, various processes can be normally run with respect to data in the second SCM.

Moreover, in addition to cases where an SCM of another computer is added, the address translation process can also be applied when a physical address of the SCM 130 changes due to a change in a capacity of the volatile memory 120 or the like.

For example, when a physical address X of the SCM 130 of a computer migrates to a physical address Y due to a change in the capacity of the volatile memory 120, by adding (Y-X) to an address represented by the physical address 350 of each entry 370 in the ID map table 132, the SCM allocation management program 226 enables the first embodiment to be continuously applied.

Data in an SCM is retained even when a power interruption, a restart, or the like of the computer 200 occurs. However, when the computer 200 itself becomes unstartable due to a failure, damage, or the like, data stored in the SCM 130 cannot be extracted. According to the present embodiment, by extracting the SCM 130 from an unstartable computer 200 and adding the SCM 130 to another computer 200, data stored in the SCM 130 can be extracted. In addition, the data stored in the SCM 130 can be continuously referred to even in the event of a change of a physical address at which the SCM 130 is arranged caused by a change in a capacity of a volatile memory or the like.

While several embodiments have been described above, it is to be understood that the described embodiments merely represent examples for illustrating the present invention and that the scope of the present invention is not limited to these embodiments. The present invention can also be implemented in various other modes.

REFERENCE SIGNS LIST

100 Computer system
110 Physical memory
120 Volatile memory
121*a* Process mapped area
121*b* Process mapped area
130 SCM
131*a* Process mapped SCM area
131*b* Process mapped SCM area
132 ID map table
140 External storage apparatus
141*a* Moved data
141*b* Moved data
150*a* Virtual address space
150*b* Virtual address space
151*a* Volatile memory area
151*b* Volatile memory area
152*a* SCM area
152*b* SCM area

The invention claimed is:
1. A computer system comprising one or more computers, the computer including:
    a processor;
    a non-volatile memory coupled to the processor; and
    a volatile memory coupled to the processor, wherein
    the processor is configured to execute a system program and an application program that uses the system program,
    the non-volatile memory is configured to store data map information which has an ID related to data used by the application program, a virtual area used by the application program, and a physical area that stores the data held in association with each other,
    the physical area is an area included in any of the non-volatile memory and a storage apparatus coupled to the processor,
    the application program is configured to issue, to the system program, an allocation request for requesting an allocation of a target virtual area with respect to target data,
    the allocation request includes a target ID corresponding to the target data,
    the system program is configured to, in response to the allocation request, determine whether or not the target ID is included in the data map information,
    the system program is configured to, when it is determined that the target ID is included in the data map information, determine whether or not a target physical area is included in the storage apparatus based on the data map information, and
    the system program is configured to, when it is determined that the target physical area is included in the storage apparatus:
        reserve a free area in the non-volatile memory as a target memory area;

copy the target data stored in the storage apparatus to the target memory area;

change the target physical area in the data map information to the target memory area; and write an association between the target virtual area and the target memory area into the volatile memory.

2. The computer system according to claim 1, wherein
the system program is configured to determine whether or not the target data satisfies a move condition configured in advance, and the system program is configured to, when it is determined that the target data satisfies the move condition:

change the target memory area associated with a target virtual area by the volatile memory to the target storage area;

migrate the target data from the target memory area to a target storage area in the storage apparatus; and change the target physical area in the data map information to the target storage area.

3. The computer system according to claim 2, wherein
the system program is configured to, when it is determined that the target ID is not included in the data map information, reserve a free area in the non-volatile memory as the target memory area and write the target data into the target memory area, and the system program is configured to:

register an association among the target ID, the target virtual area, and the target memory area to the data map information; and write an association between the target virtual area and the target memory area into the volatile memory.

4. The computer system according to claim 3, wherein
the application program is configured to generate a process, the system program is configured to associate a process using the data with the ID in the data map information, the system program is configured to, when receiving a deletion request of the target data from a process, determine whether or not the target data is associated with a specific process other than a request source process of the deletion request in the data map information, and the system program is configured to, when the target data is not associated with the specific process:

delete the target data from the target physical area;

delete an association of the target ID in the data map information; and delete an association between a target virtual area and a target physical area in the volatile memory.

5. The computer system according to claim 4, wherein
the system program is configured to, when the specific process is not associated with the target data, determine whether the target physical area in which the target data is stored is included in the non-volatile memory or included in the storage apparatus, the system program is configured to delete the target data in the memory area when the target physical area is included in the non-volatile memory, and the system program is configured to delete the target data in the storage area when the target physical area is included in the storage apparatus.

6. The computer system according to claim 5, wherein
the allocation request includes authentication information for proving validity of the application program executing the target process, and the system program is configured to, when it is determined that the application program is valid based on the authentication information, determine whether or not the target ID is included in the data map information.

7. The computer system according to claim 5, wherein
the move condition is a restart of the application program when the application program has not been normally terminated.

8. The computer system according to claim 5, wherein
the move condition is an issuance of a release request of an allocation of the target virtual area and the target memory area in the target data.

9. The computer system according to claim 5, wherein
the one or more computers include a first computer and a second computer, the first and second computers are coupled to each other, non-volatile memories of the first and second computers are configured to store the data map information, the data map information includes an identifier of a computer including the physical area, the physical area is included in any of the non-volatile memories in the first and second computers, and the storage apparatus, the first computer is configured to, when a first system program of the first computer receives the allocation request from a first application program using the first system program determine, in response to the allocation request, whether or not the target ID is included in the data map information, the first computer is configured to, when it is determined that the target ID is included in the data map information, determine whether or not a target physical area is included in the non-volatile memory in the first computer based on the data map information, the first computer is configured to, when it is determined that the target physical area is not included in the non-volatile memory in the first computer, determine whether the target physical area is included in the non-volatile memory in the second computer based on the data map information, the first computer is configured to migrate a target process using the target data to the second computer when it is determined that the target physical area is included in the non-volatile memory in the second computer, and the second computer is configured to, in response to the migration of the target process, associate the target process with a target ID, the target virtual area, and the target physical area of the second computer in the data map information.

10. The computer system according to claim 5, wherein
the one or more computers include a first computer and a second computer, the first and second computers are coupled to each other, non-volatile memories of the first and second computers are configured to store the data map information, the data map information includes an identifier of a computer including the physical area, the physical area is included in any of the non-volatile memories in the first and second computers, and the storage apparatus, the second computer is configured to, when a first non-volatile memory in the first computer is cut off from a processor in the first computer and coupled to a processor in the second computer, change a virtual area included in first data map information stored in the first non-volatile memory, and write an association between the changed virtual area and a physical area into a volatile memory in the second computer.

11. The computer system according to claim 1, wherein the system program is a hypervisor and an OS, the hypervisor is configured to execute a virtual computer, the virtual computer is configured to execute an OS and an application program using the OS, the non-volatile memory is configured to store first guest map information which has the ID, the virtual area, and a guest area allocated to the data in the virtual computer held in association with each other, the non-volatile memory is configured to store second guest map information which has the ID, the guest area, and a physical area storing the data held in association with each other, an application program of a target virtual computer using target data is configured to issue, to an OS of the target virtual computer, an allocation request for requesting an allocation of a target virtual area with respect to the target data, the OS is configured to, in response to the allocation request, determine whether or not an association between the target ID and a target guest area storing the target data is included in the first guest map information, the target OS is configured to transfer the allocation request to the hypervisor when it is determined that the association is not included in the first guest map information, the hypervisor is configured to, in response to the allocation request, determine whether or not the target ID is included in the second guest map information, the hypervisor is configured to, based on the second guest map information, determine whether or not a target physical area is included in the storage apparatus, when it is determined that the target ID is included in the second guest map information, the hypervisor is configured to, when it is determined that the target physical area is included in the storage apparatus:
  reserve a free area in the non-volatile memory as a target memory area;
  copy the target data stored in the storage apparatus to the target memory area;
  in the second guest map information, change the target physical area to the target memory area and associate the target guest area with the target ID and the target memory area;
  write an association between the target guest area and the target memory area into the volatile memory; and
  notify the OS of the change of the association, and
the OS is configured to, in response to the notification:
  associate the ID, the target virtual area, and the target guest area with each other in the first guest map information; and
  write an association between the target virtual area and the target guest area into the volatile memory.

12. The computer system according to claim 11, wherein the OS is configured to, when receiving a release request of an allocation of the target virtual area and the guest area in the target data:
  release the association between the target virtual area and the target guest area in the virtual area; and
  transfer the release request to the hypervisor,
the hypervisor is configured to:
  release the association between the target guest area and the target memory area in the volatile memory in response to the release request;
  determine whether or not the target data is to be moved to the storage area from the memory area;
  migrate the target data from the target memory area to a target storage area in the storage apparatus when it is determined that the target data is to be moved;
  change the target memory area in the first guest map information to the target storage area, and notify the OS of a response to the effect that the move has been completed, and
the OS is configured to release the association between a target virtual area and the target guest area in the second guest map information.

13. The computer system according to claim 12, wherein the application program is configured to generate a process, the OS is configured to associate a process using the data with the ID in the first guest map information, the OS is configured to, when receiving a deletion request of the target data from a process, determine whether or not the target data is associated with a specific process other than a request source process of the deletion request in the first guest map information, and the OS is configured to transfer the deletion request to the hypervisor when the target data is not associated with the specific process, and the hypervisor is configured to:
  delete the target data from the target physical area;
  delete an association of the target ID in the second guest map information; and
  delete an association between a target guest area and a target physical area in the volatile memory.

14. A computer, comprising:
a processor;
a non-volatile memory coupled to the processor; and
a volatile memory coupled to the processor, wherein
the processor is configured to execute a hypervisor,
the hypervisor is configured to execute a virtual computer,
the virtual computer is configured to execute an OS and an application program using the OS,
the non-volatile memory is configured to store first guest map information which has an ID related to data used by the application program, a virtual area used by the application program, and a guest area allocated to the data in the virtual computer held in association with each other,
the non-volatile memory is configured to store second guest map information which has the ID, the guest area, and a physical area storing the data held in association with each other,
the physical area is included in any of the non-volatile memory and a storage apparatus coupled to the processor,
an application program of a target virtual computer using target data is configured to issue, to an OS of the target virtual computer, an allocation request for requesting an allocation of a target virtual area with respect to the target data,
the allocation request includes a target ID corresponding to the target data,
the OS is configured to, in response to the allocation request, determine whether or not an association between the target ID and a target guest area storing the target data is included in the first guest map information, the target OS is configured to transfer the allocation request to the hypervisor when it is determined that the association is not included in the first guest map information, the hypervisor is configured to, in response to the allocation request, determine whether or not the target ID is included in the second guest map information, the hypervisor is configured to, based on the second guest map information, determine whether or not a target physical area is included in the storage apparatus, when it is determined that the target ID is included in the second guest map information, the hypervisor is configured to, when it is determined that the target physical area is included in the storage apparatus:
- associate a target guest area storing the target data in the target computer with the target ID and the target physical area in the second guest map information;
- write an association between the target guest area and the target physical area into the volatile memory; and
- notify the OS of the change of the association, and the OS is configured to, in response to the notification:
- associate the ID, the target virtual area, and the target guest area with each other in the first guest map information; and
- write an association between the target virtual area and the target guest area into the volatile memory.

15. A method executed by a computer including a processor, a non-volatile memory coupled to the processor, and a volatile memory coupled to the processor, the non-volatile memory storing data map information which has an ID related to data used by an application program, a virtual area used by the application program, and a physical area that stores the data held in association with each other, the physical area being an area included in any of the non-volatile memory and a storage apparatus coupled to the processor, the method comprising:

when there is an allocation request which includes a target ID corresponding to target data and which requests an allocation of a target virtual area with respect to the target data, determining, in response to the allocation request, whether or not the target ID is included in the data map information;

when it is determined that the target ID is included in the data map information, determining whether or not a target physical area is included in the storage apparatus based on the data map information; and when it is determined that the target physical area is included in the storage apparatus, reserving a free area in the non-volatile memory as a target memory area, copying the target data stored in the storage apparatus to the target memory area, changing the target physical area in the data map information to the target memory area, and writing an association between the target virtual area and the target memory area into the volatile memory.

* * * * *